(12) United States Patent
Iwayama et al.

(10) Patent No.: US 7,954,846 B2
(45) Date of Patent: Jun. 7, 2011

(54) INTERIOR STRUCTURE OF VEHICLE

(75) Inventors: Yukio Iwayama, Hiroshima (JP);
Shusuke Okada, Hiroshima (JP);
Masafumi Sakakida, Hiroshima (JP);
Masaki Motoki, Hiroshima (JP)

(73) Assignee: Mazda Motor Corporation (JP)

( * ) Notice: Subject to any disclaimer, the term of this patent is extended or adjusted under 35 U.S.C. 154(b) by 0 days.

(21) Appl. No.: 12/606,831

(22) Filed: Oct. 27, 2009

(65) Prior Publication Data
US 2010/0201108 A1    Aug. 12, 2010

(30) Foreign Application Priority Data

| Feb. 6, 2009 | (JP) | ................. | 2009-026335 |
| Feb. 6, 2009 | (JP) | ................. | 2009-026336 |
| Mar. 13, 2009 | (JP) | ................. | 2009-060383 |

(51) Int. Cl.
*B60R 21/16* (2006.01)
(52) U.S. Cl. .................................................. 280/730.2
(58) Field of Classification Search ............... 280/730.2, 280/730.1, 733, 802
See application file for complete search history.

(56) References Cited

U.S. PATENT DOCUMENTS

| 2003/0141709 A1 | 7/2003 | Honda et al. |
| 2003/0184061 A1 | 10/2003 | Honda et al. |
| 2009/0184503 A1 * | 7/2009 | Itoga .............................. 280/733 |

FOREIGN PATENT DOCUMENTS

| EP | 1 586 489 A1 | 10/2005 |
| JP | 2000-016208 A | 1/2000 |
| JP | 2003-118368 A | 4/2003 |
| JP | 2006-088899 A | 4/2006 |
| WO | 2002/100691 | 12/2002 |

OTHER PUBLICATIONS

Extended European Search Report dated Mar. 30, 2010; Application No. 09015522.7-1523.

* cited by examiner

*Primary Examiner* — Faye M. Fleming
(74) *Attorney, Agent, or Firm* — Studebaker & Brackett PC; Donald R. Studebaker

(57) ABSTRACT

A door trim covers a door body of a side door. An article storage portion is provided at a lower portion of the door trim. A seat is provided beside the side door so that the seat and the side door are overlapped when viewed from a vehicle side. A side airbag device includes an airbag which inflates beside the seat with gas supplied from an inflator at a vehicle side crash and protects chest and waist portions of a passenger. A recess is provided at the door trim. The recess is concaved toward a vehicle outside at an upper portion of the door trim above the article storage portion. A covering member which restrains the airbag from coming into the recess is provided at the door trim so as to cover almost half of the recess.

15 Claims, 26 Drawing Sheets

INTERIOR STRUCTURE OF VEHICLE

BACKGROUND OF THE INVENTION

The present invention relates to an interior structure of a vehicle which comprises a side airbag.

Conventionally, a large-sized impact absorbing member to absorb an impact load at a vehicle side crash is provided at the side door of the vehicle.

For example, Japanese Patent Laid-Open Publication No. 2000-16208 discloses the interior structure of a vehicle, in which the article storage portion is provided at the side door and the impact absorbing member is disposed at the upper edge of this article storage portion. In this case, a sufficiently-large article storage portion of the side door may not be ensured, so that there is a restriction in a vehicle layout.

Further, according to the interior structure of a vehicle disclosed in Japanese Patent Laid-Open Publication No. 2003-118368, the side airbag device is provided at the seat so that it can be prevented that the side airbag device interferes with the side wall of the door pocket at the inflation of the airbag.

In these days, the side airbag device which covers even a waist portion of a passenger has been developed. Herein, it has been also tried to enlarge the size of a vehicle-equipment portion provided at the door, such as a door pocket. However, there is a concern that the airbag inflating at the vehicle side crash may come into an upper portion of the pocket, so that the inflation of the airbag would become so unstable that the passenger could not be properly prevented from moving toward the vehicle outside.

Meanwhile, Japanese Patent Laid-Open Publication No. 2006-88899 discloses the interior structure of a vehicle which comprises the seatbelt which is equipped with the air belt at its lap belt portion. Herein, even if this seatbelt with the air belt is additionally applied, the air belt and the side airbag may perform their functions of protecting the passenger merely independently, so that the prevention of the position of the passenger seated toward the vehicle outside could not be achieved sufficiently. While WO2002/100691 A1 also discloses the structure equipped with the side airbag, this structure may not solve the above-describe concern either.

SUMMARY OF THE INVENTION

The present invention has been devised in view of the above-described matters, and an object of the present invention is to provide an interior structure of a vehicle which can make the vehicle-equipment potion properly large and prevent properly the seated passenger from moving toward the vehicle outside.

According to the present invention, there is provided an interior structure of a vehicle, comprising a door trim covering a door body of a side door of the vehicle from the vehicle inside, a vehicle-equipment portion provided at a lower portion of the door trim, a recess provided at the door trim, the recess being concaved toward a vehicle outside at an upper portion of the door trim above the vehicle-equipment portion of the door trim, a seat provided beside the side door, the seat and the side door being overlapped when viewed from a vehicle side, and a side airbag device equipped with an airbag and stored in the seat, the airbag inflates with gas supplied from an inflator at a vehicle side crash so as to protect at least a waist portion of a passenger seated in the seat, wherein the recess is position beside the passenger seated in the seat, and a controlling means for controlling a vehicle-width position of the airbag by inflating around the recess is provided.

According to the present invention, since the controlling means for controlling the vehicle-width position of the airbag by inflating around the recess is provided, both making the vehicle-equipment potion properly large and preventing properly the passenger from moving toward the vehicle outside can be achieved.

According to an embodiment of the present invention, the controlling means is constituted by a covering member which is provided at the door trim and covers over at least part of the recess so as to restrain the airbag from coming into the recess. Thereby, since the covering member restrains the airbag from coming into the recess, the inflation of the airbag can be made so appropriate that it can be restrained by the support of the covering member that the airbag improperly flutters in the vehicle width direction. Accordingly, the inflation state of the airbag can be stable and the move of the passenger toward the vehicle outside can be prevented. Thus, the airbag can be restrained from coming into the recess regardless of the existence of the recess, so that both making the vehicle-equipment potion properly large and protecting the passenger can be easily achieved. Herein, the above-described "to restrain the airbag from coming into the recess" means to prevent the airbag from coming into the recess without obstructing the proper protection of the passenger by the airbag.

According to another embodiment of the present invention, an armrest which extends in a vehicle longitudinal direction along an upper edge of the recess and projects toward a vehicle inside is provided at a portion of the door trim which is located above the vehicle-equipment portion, the vehicle-equipment portion comprising an article storage portion which is formed by an inside wall and an outside wall, which are disposed facing to each other, and a bottom wall which interconnects the inside and outside walls, and the covering member extends from an upper edge of the inside wall to a position near a lower portion of the armrest. Thereby, since the covering member extends above the inside wall of the article storage portion, the airbag can be prevented from coming into the recess. Accordingly, the longitudinal size of the article storage portion can be made properly large without obstructing the function of the passenger's protection, thereby improving the facilities.

According to another embodiment of the present invention, the covering member comprises an upper portion which takes a closed position in which the recess is covered with the covering member and an open position in which the covering member opens toward the vehicle inside. Thereby, the airbag can be surely restrained from coming into the recess with the covering member in its closed position. Making the upper portion of the covering member take its open position enables any article to be put in or out through this upper portion in the open position, so that the facility of the article storage portion can be improved.

According to another embodiment of the present invention, an upper end of the covering member extends rearward so as to slant upward. Thereby, the design is improved. Further, since the opening area of the article storage portion becomes wider compared to a case in which the upper end of the covering member extends rearward horizontally, the article's putting in or out from a front portion of the article storage portion can be facilitated. Further, the airbag coming in can be surely restrained at a position where the upper end of the covering member is located at the high level.

According to another embodiment of the present invention, the seat is provided so as to slide in a vehicle longitudinal direction by means of a slide mechanism with a slide rail, and the covering member is positioned so as to overlap with a moving range of a hip point of the passenger seated in the seat which is formed according to a slide of the seat when viewed from the vehicle side. Thereby, the inflating airbag can be supported from the vehicle inside by the covering member and the move of the passenger toward the vehicle outside can be prevented regardless of the position of the seat within the slide moving range.

According to another embodiment of the present invention, the covering member is movable in the vehicle longitudinal direction or the width of the covering member in the vehicle longitudinal direction is adjustable. Thereby, the function of the passenger's protection can be surely performed by moving the covering member to the appropriate position where the airbag can be restrained from coming in. Particularly, in case the seat is movable so as to slide or the like, since the inflation state of the airbag can be stable by moving the covering member to a position corresponding to the inflation position of the airbag, the passenger can be protected with improvement of an operation of the vehicle-equipment portion by reducing an occupying area of the covering member. Further, in case of the article storage portion or the like, the position or the size of the opening of the article storage portion can be changed by adjusting the move or the width of the covering member, thereby improving the facilities.

According to another embodiment of the present invention, the covering member is made of a net. Thereby, the proper visibility of the vehicle-equipment portion can be ensured.

According to another embodiment of the present invention, the interior structure of a vehicle further comprises a seatbelt to restrain a move of the passenger seated at the vehicle side crash, wherein the seatbelt comprises a lap-belt portion to hold the waist portion of the passenger, the lap-belt portion includes an air belt at a vehicle-outside portion thereof which inflates with gas supplied from another inflator for air belt at the vehicle side crash at a position which is located on the side of the passenger relative to the airbag of the side airbag device, the air belt constitutes the controlling means, and the air belt and the airbag of the side airbag device inflate between the door trim and the passenger seated so as to be overlapped when viewed from the vehicle side. Thereby, the move of the waist portion of the passenger seated toward the vehicle outside can be further restrained by the air belt in addition to the airbag of the side airbag device. Further, since the space between the door trim and the passenger seated is properly occupied by the air belt and the airbag even if the space becomes large, the airbag can be restrained from fluttering in the vehicle width direction. Consequently, the move of the passenger seated can be surely restrained. Accordingly, both making the vehicle-equipment potion properly large and protecting the passenger seated can be achieved properly. Moreover, since the gas is supplied to the air belt from the inflator for air belt, the belt length of the lap-belt portion can be shortened without the pre-tensioner mechanism, thereby performing the function of a lap pre-tensioner function.

According to another embodiment of the present invention, the airbag of the side airbag device comprises a waist-protecting airbag to protect the waist portion of the passenger seated and a chest-protecting airbag to protect a chest portion of the passenger seated, the waist-protecting airbag and the chest-protecting airbag are connected via a connecting portion, and the inflator of the side airbag device is arranged such that the waist-protecting airbag inflates before the chest-protecting airbag does at the vehicle side crash. Thereby, since the waist-protecting airbag which is important for protecting the passenger seated inflates surely before the chest-protecting airbag does at the vehicle side crash, the passenger seated can be protected surely. Herein, there may be a problem in that the waist-protecting portion tends to inflate into the above-described space in case it's inflation position is located above the vehicle-equipment portion. According to the present embodiment, however, since the air belt inflates so as to overlap with the waist-protecting portion, the protection of the passenger seated with the air belt can be achieved effectively. That is, the move of the waist portion of the passenger seated toward the vehicle outside can be restrained by the air belt in addition to the waist-protecting airbag of the side airbag device.

According to another embodiment of the present invention, the air belt of the seatbelt inflates up to a maximum inflation state thereof after the waist-protecting airbag of the side airbag device does. Thereby, any improper interference of the air belt inflating at the vehicle side crash with the waist-protecting airbag can be properly avoided. Thus, since the waist-protecting airbag is more important than the air belt, the passenger can be protected more surely.

According to another embodiment of the present invention, the controlling means is constituted by an inflation restraining member which is provided at a portion of the airbag which protects the waist portion of the passenger seated in the seat and restrains an inflation of the portion of the airbag in a vertical direction so as to promote the inflation of the portion of the airbag located beside the recess in a vehicle width direction. Thereby, the thickness (the length in the vehicle width direction) of the inflating airbag is made greater compared to a case the inflation restraining member is not provided, and the inflating airbag easily comes into the recess before contacting the passenger seated, so that the airbag can be prevented from moving greatly toward the vehicle outside when the passenger contacts the airbag and thereby the passenger can be held by the airbag properly. That is, the passenger can be protected properly. Further, since the vertical inflation of the airbag is restrained by the inflation restraining member, the large-sized airbag can be avoided as well. Thus, according to the present embodiment, the seated passenger can be properly protected, restraining the size of the airbag from being large-sized, even in case the recess is formed at the inner face of the side door beside the passenger seated.

According to another embodiment of the present invention, an armrest which extends in a vehicle longitudinal direction along an upper edge of the recess and projects toward a vehicle inside is provided on an inside face of the side door, and the portion of the airbag which protects the waist portion of the passenger seated in the seat inflates at a position which is located beside the recess and below the armrest. Thereby, any improper interference of the inflating airbag with the armrest can be avoided even in case the armrest is provided.

According to another embodiment of the present invention, the airbag of the side airbag device comprises a waist-protecting airbag to protect the waist portion of the passenger seated and a chest-protecting airbag to protect a chest portion of the passenger seated, the waist-protecting airbag and the chest-protecting airbag are formed by a separation of a single bag, and a position of the separation is located at a level of the armrest when the airbag inflates. Thereby, reduction of manufacturing costs and improvement of disposition of the airbag can be achieved. Herein, the position of the separation is located at the level of the armrest when the airbag inflates, that is, the thickness of a specified portion of the airbag which is positioned at the level of the armrest is smaller than the other portion, i.e., its upper or lower portions. Accordingly, the interference of the both airbags with the armrest can be avoided, thereby ensuring the proper inflation of the both airbags.

According to another embodiment of the present invention, the inflator which supplies the gas to the waist-protecting airbag and chest-protecting airbag is common to the two bags, and the length of a gas supply passage for the waist-protecting airbag is shorter than that of a gas supply passage for the chest-protecting airbag. Thereby, since the inflator is common to the waist-protecting and chest-protecting airbags, the reduction of the manufacturing costs and the improvement of the disposition can be achieved more properly. Further, since the length of the gas supply passage for the waist-protecting airbag is shorter than that of the gas supply passage for the chest-protecting airbag, the gas can be supplied to the waist-protecting airbag mainly, giving priority to the protection of the passenger's waist portion.

According to another embodiment of the present invention, the airbag is attached to an attaching position of the seat which is located above the recess of the side door and inflates downward from the attaching position according to the gas supply which is directed downward, the inflation restraining member is constituted by a tether which expands substantially vertically inside the portion of the inflating airbag which protects the waist portion of the passenger seated in the seat, an upper end of which is joined to an upper end of the portion of the inflating airbag which protects the waist portion of the passenger seated and a lower end of which is joined to a specified portion which is located toward the vehicle inside from a lower end of the portion of the inflating airbag which protects the waist portion of the passenger seated. Thereby, a force acts on the airbag so as to make the airbag rotate in such a manner that its lower portion rotates toward the side door around the upper portion of the airbag. As a result, the airbag rotates toward the recess. Accordingly, a situation in which the airbag moves toward the side door after the passenger seated contacts the airbag can be retrained more properly.

Herein, the driver's seat is usually configured to slide longitudinally for providing a proper driving of the vehicle regardless of the body size. The passenger's seat is also configured to slide longitudinally for ensuring an appropriate passenger's sitting in the seat. Accordingly, it is preferable that the recess for the storage of articles be located at the position which corresponds to the longitudinal moving position of the driver's waist portion when the driver's seat slides longitudinally so that the driver can easily put in or out the articles. Herein, a relatively-small sized passenger has a smaller width of the waist portion (in the vehicle width direction) compared to a normal sized passenger, so that the distance between the waist portion and the outside wall of the recess may become greater. Meanwhile, the width of the airbag (in the vehicle width direction) is constant. Therefore, in case the small-sized passenger is seated, the moving distance of the small-sized passenger till the passenger's contact with the airbag in the vehicle width direction may become greater, so that there is a concern that the small-sized passenger would receive a larger impact. Herein, in case the relatively-small sized passenger is seated in the driver' seat, this passenger tends to slide the seat forward to hold the steering wheel appropriately. Meanwhile, in case the relatively-small sized passenger is seated in the passenger's seat (assistant's seat), this passenger tends to slide the seat forward to operate equipments provided at the instrument panel or the like appropriately.

According to another embodiment of the present invention, the seat is a driver's seat or a passenger's seat, which are movable with a longitudinal slide, the recess is located at a position which corresponds to a moving range of the waist portion of the passenger seated, and a width of the recess in the vehicle width direction is configured such that the width of a front portion of the recess which is located at a position which corresponds to the waist portion of the passenger seated in the seat which has slid forward is smaller than that the width of a rear portion of the recess which is located at a position which corresponds to the waist portion of the passenger seated in the seat which slid rearward. Thereby, the distance between the relatively-small sized passenger and the side wall of the recess can be properly restrained, so that the impact absorption can be achieved properly even in case of the relatively-small sized passenger.

Other features, aspects, and advantages of the present invention will become apparent from the following description which refers to the accompanying drawings.

DETAILED DESCRIPTION OF THE INVENTION

Hereinafter, preferred embodiments of the present invention will be described referring to the accompanying drawings.

Embodiment 1

Figure 1:
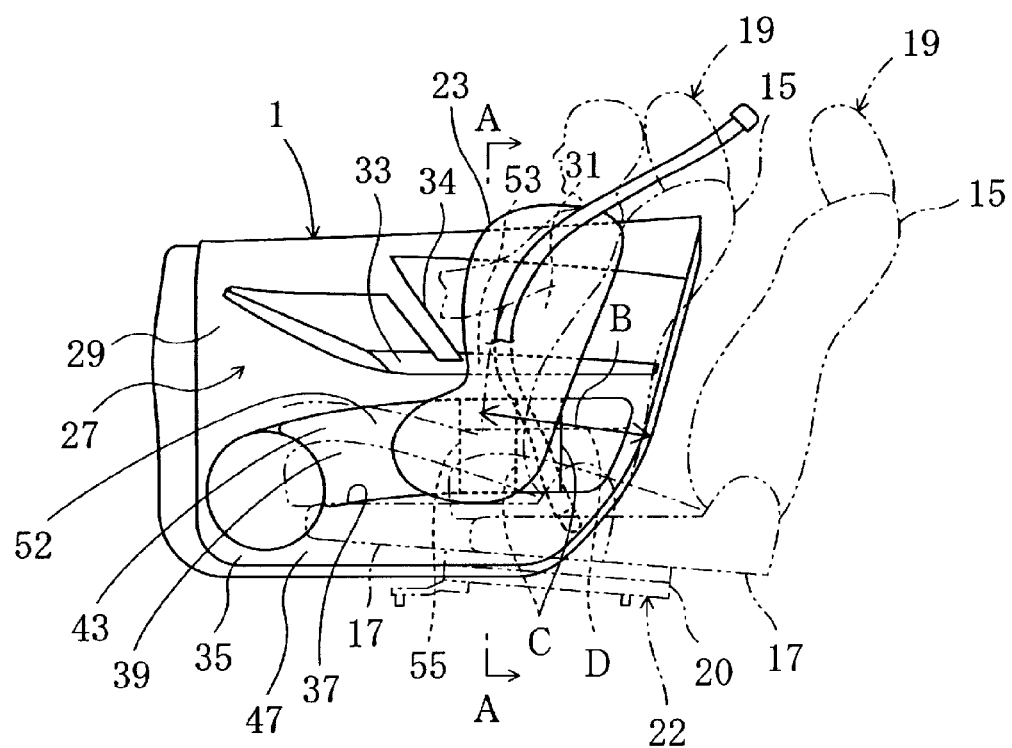
FIG. 1 is a side view of a side door of a vehicle to which an interior structure of a vehicle according to a first embodiment is applied, when viewed from a vehicle inside.
Figure 2:
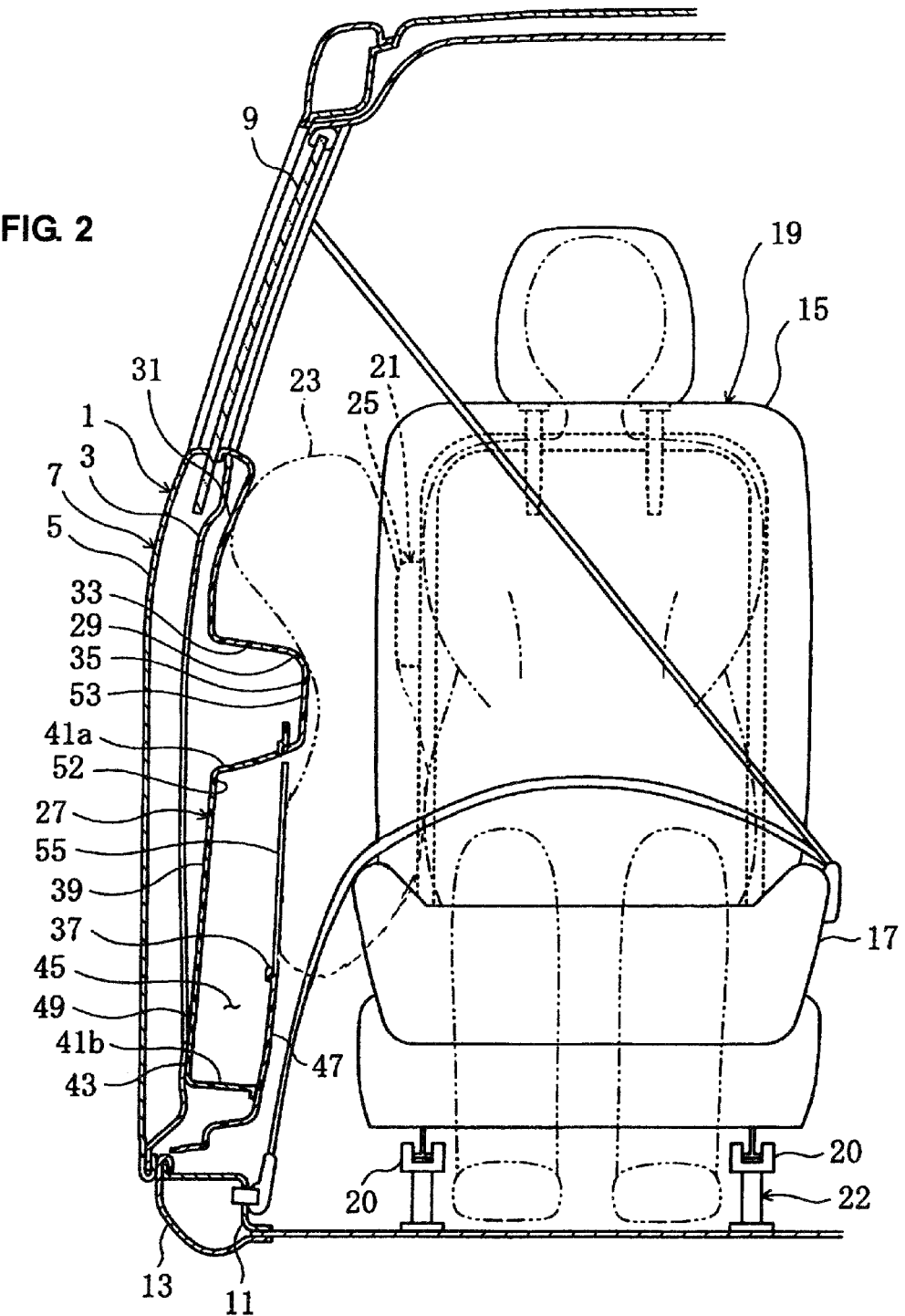
FIG. 2 is a sectional view taken along line A-A of FIG. 1.

FIG. 1 shows a side door 1 of a vehicle to which an interior structure of a vehicle according to a first embodiment is applied. This side door 1, which is a front right side door of an automotive vehicle, comprises a door body 7 which includes an inner panel 3 and an outer panel 5 which are made from metal as shown in FIG. 2. A window glass 9 is provided at an upper portion of the door body 7, and a side sill inner 11 and a side sill outer 13, which are made from metal, extend in a vehicle longitudinal direction at a lower portion of the door body 7.

Further, a front right seat 19 which comprises a seatback 15 and a seat cushion 17 is arranged inside the vehicle so that the seat 19 and the side door 1 are overlapped when viewed from a vehicle side. The seat 19 is configured to slide in the vehicle longitudinal direction by means of a slide mechanism 22 which includes a slide rail 20. A side airbag device 21 is stored in the seatback 15 at a portion near a middle right-side end of the seatback 15. The side airbag device 21 comprises an airbag 23 which inflates beside the seat 19, namely between the side door 1 and a passenger seated in the seat 19, and an inflator 25 which supplies inflatable gas to the airbag 23. The inflator 25 is disposed so as to emit the gas downward. Herein, while the airbag 23 is stored inside the seatback 15 in its folded state, the airbag 23 in such a state is not illustrated.

The door body 7 is covered with a door trim 27 which is made from resin from a vehicle inside, and the door trim 27 comprises a door trim body 29 and a back lid portion 43. An opening 37 which is of a substantially-rectangular shape and extends in the vehicle longitudinal direction is formed at a lower portion of the door trim body 29. The opening 37 is covered with the back lid portion 43 in such a manner that its opening side faces to the vehicle inside. The door trim body 29 comprises a first wall portion 31 which forms an upper portion of the door trim body 29, a second wall portion 33 which extends inwardly from a lower edge of the first wall portion 31, and a third wall portion 35 which extends downward from a vehicle-inside edge of the second wall portion 33. The second wall portion 33 extends forward so as to slant upward, and a grip portion 34, which is to be held by the passenger when the side door 1 is operated, is provided so as to slant upward from a middle portion of the second wall portion 33 in the vehicle longitudinal direction. Further, the above-described opening 37 is formed at a middle portion of the third wall portion 35.

The back lid portion 43 comprises a substantially-rectangular vertical wall 39, an upper wall 41a and a bottom wall 41b which are provided above and below the vertical wall 39. The bottom wall 41b extends below a lower end edge of the opening 37, and a tip edge of the bottom wall 41b contacts the third wall portion 35. Herein, an article storage portion 45 is formed by the vertical wall 39 of the back lid portion 37, a specified portion of the third wall portion 35 which faces to the vertical wall 39 in the vehicle width direction, and the bottom wall 41b which interconnects the vertical wall 39 and the third wall portion 35. That is, the vertical wall 39 of the back lid portion 43 forms an outside wall 49 of the article storage portion 45, and a specified portion which is from a lower edge of the opening 37 at the third wall portion 35 to the bottom wall 41b forms an inside wall 47 of the article storage portion 45. Further, an armrest 53 which projects toward the vehicle inside is formed by the second wall portion 33, the third wall portion 35, and the upper wall 41a of the back lid portion 45, namely the door trim 27 above the article storage portion 45. Moreover, a recess 52 which is concaved toward the vehicle outside is formed between the article storage portion 45 and the armrest 53.

A plate-shaped covering member 55 is provided at the lower edge of the opening 37 at the third wall portion 35, namely at a rear half part of the upper edge of the inside wall 47 so as to extend from the upper edge of the inside wall 47 to a position near the lower portion of the armrest 53. The covering member 55 covers almost a half of the recess 52. Herein, the disposition position of the covering member 55 overlaps with a moving range (shown by an arrow B in FIG. 1) of a hip point of the passenger seated according to the slide move of the seat 19, when viewed from the vehicle side.

According to the above-described interior structure of a vehicle, the inflator 25 supplies the gas to the airbag 23 at the vehicle side crash, and the airbag 23 inflates forward and outward between the side door 1 and the passenger seated in the seat 19 as shown by an two-dotted broken line in FIG. 2 so as to expand vertically from around the upper end of the door trim 27 till around the lower end of the covering member 55, thereby protecting the chest and waist portions of the passenger. This covering member 55 restrains the inflating airbag 23 from coming into the recess 52 and holds the airbag 23 from the vehicle inside. Thus, since the covering member 55 restrains the airbag 23 from coming into the recess 52 of the side door 1, the inflation of the airbag can be made so proper that it can be restrained by the support of the covering member 55 that the airbag improperly flutters in the vehicle width direction. Accordingly, the inflation state of the airbag can be stable and the move of the passenger toward the vehicle outside can be prevented.

According to the present embodiment, since the airbag 23 can be restrained from coming into regardless of the existence of the recess 52, the passenger can be properly protected by the side airbag device 21 even in case the large article storage portion 45 is formed without any impact absorbing member inside the side door 1. Further, since the covering member 55 is positioned so as to overlap with the moving range of the hip point of the passenger seated in the seat 19 which is formed according to the slide of the seat 19 when viewed from the vehicle side, the inflating airbag 23 can be supported from the vehicle inside by the covering member 55 and the move of the passenger toward the vehicle outside can be prevented regardless of the position of the seat 19 within the slide moving range.

Embodiment 2

Figure 3:
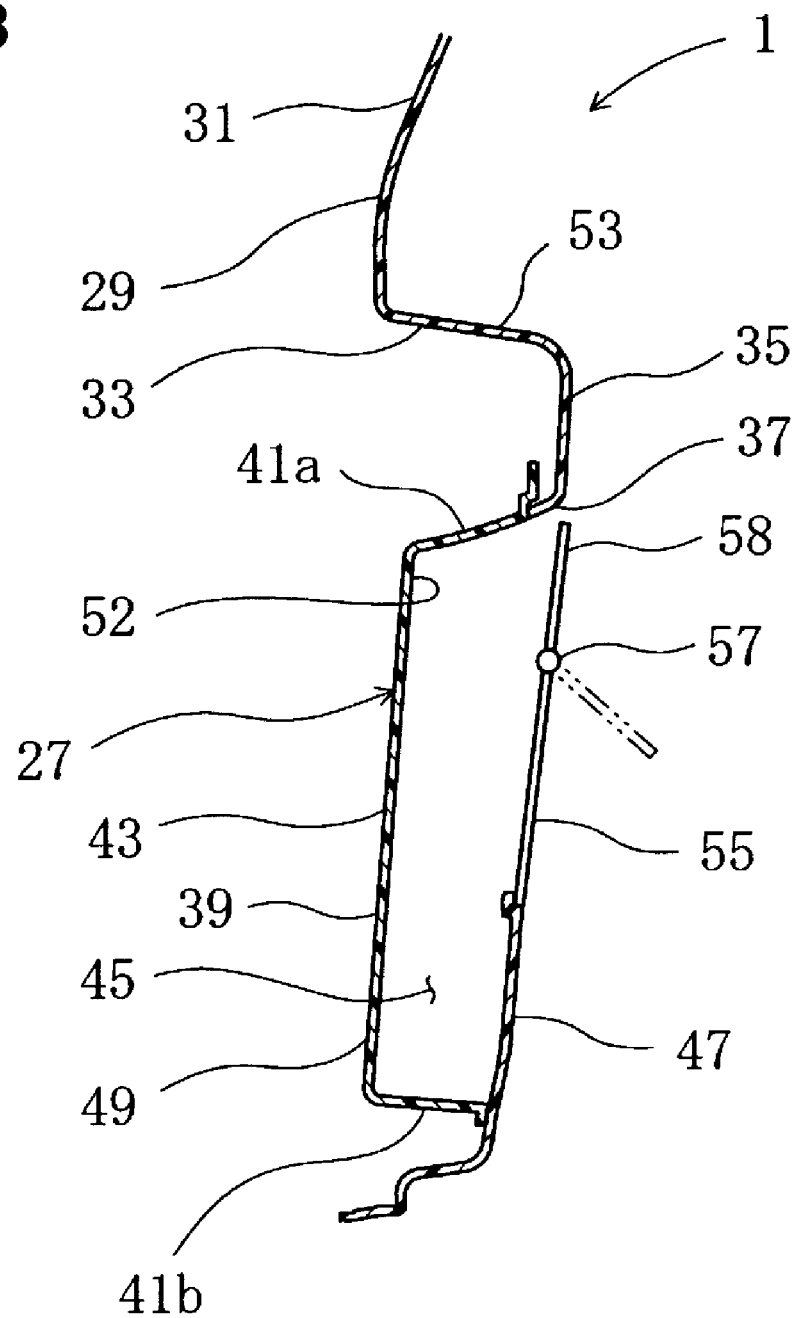
FIG. 3 is a sectional view of a covering member and its surroundings according to a second embodiment, which corresponds to FIG. 2.

FIG. 3 shows the side door 1 to which an interior structure of a vehicle according to a second embodiment. In the second embodiment, a hinge 57 (shown by a broken line D in FIG. 1)

is formed at a position near the upper portion of the covering member 55, and an upper portion of the covering member 55 which is positioned above the hinge 57 forms a lid member 58 which can move from its closed position in which the lid member 58 closes the recess 52 to its open position in which the lid member 58 opens toward the vehicle inside. The other structures of the present embodiment are the same as those of the above-described first embodiment, which are denoted by the same reference characters. Their detailed descriptions will be omitted here.

According to the present embodiment, the airbag 23 can be surely restrained from coming into the recess 52 with the lid member 58 in the closed position, and when the lid member 58 is open, any article can be put into the article storage portion 45 from the upper portion of the covering member 55, or it can be put out of the upper portion of the article storage portion 45. Thus, the article storage portion 45 can be used more easily.

Embodiment 3

Figure 4:
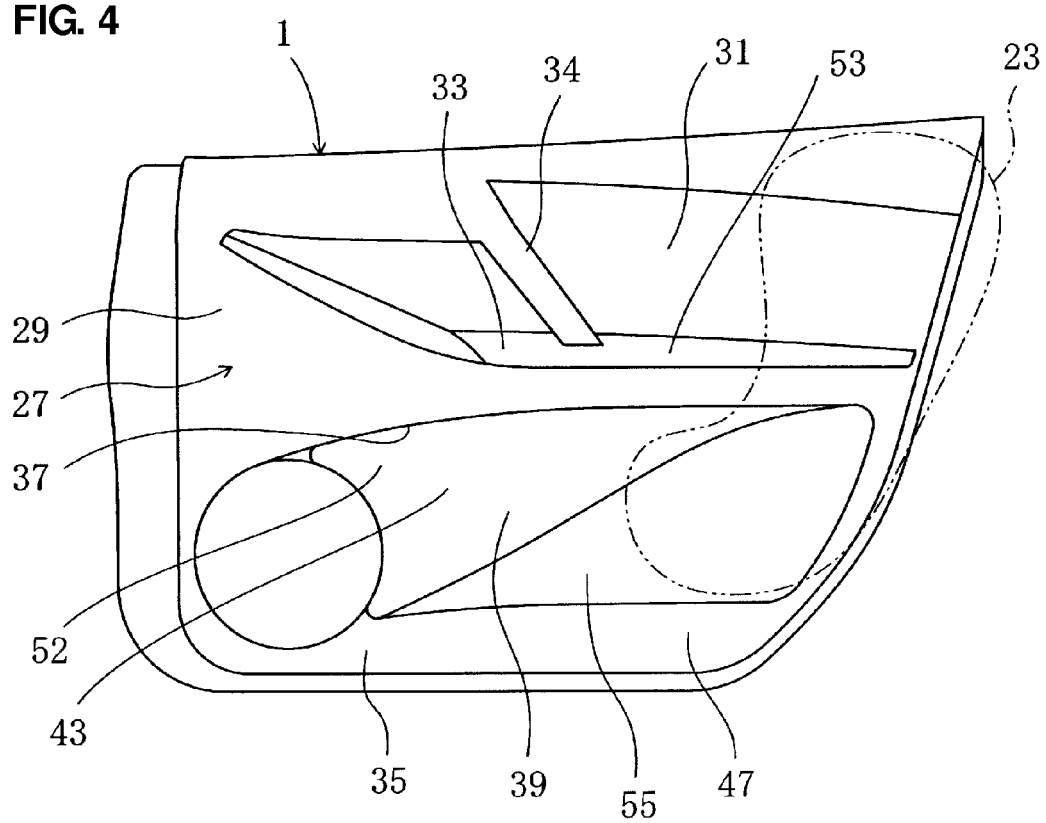
FIG. 4 is a side view according to a third embodiment, which corresponds to FIG. 1.

FIG. 4 shows the side door 1 of a vehicle to which an interior structure of a vehicle according to a third embodiment is applied. According to the third embodiment, the covering member 55 is formed over the lower edge of the opening 37 of the third wall portion 35, that is, a whole part of the upper edge of the inside wall 47, and the upper end of the covering member 55 extends rearward so as to slant upward. The other structures of the present embodiment are the same as those of the above-described first embodiment, which are denoted by the same reference characters. Their detailed descriptions will be omitted here.

According to the present embodiment, the design can be improved. Further, since the opening area of the article storage portion 45 becomes wider compared to a case in which the upper end of the covering member 55 extends rearward horizontally, the article's putting in or out from the front portion of the article storage portion 45 can be facilitated. Further, the airbag 23 coming in can be surely restrained at a position where the upper end of the covering member 55 is located at the high level.

Embodiment 4

Figure 5:
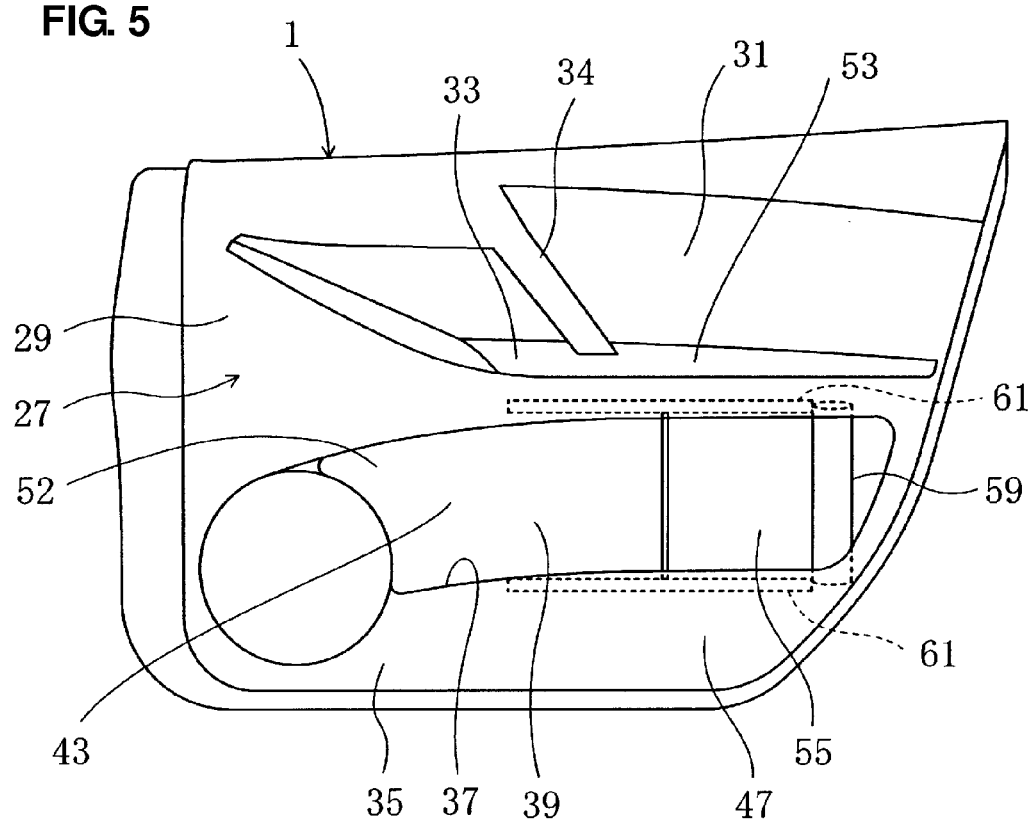
FIG. 5 is a side view according to a fourth embodiment, which corresponds to FIG. 1.
Figure 6:
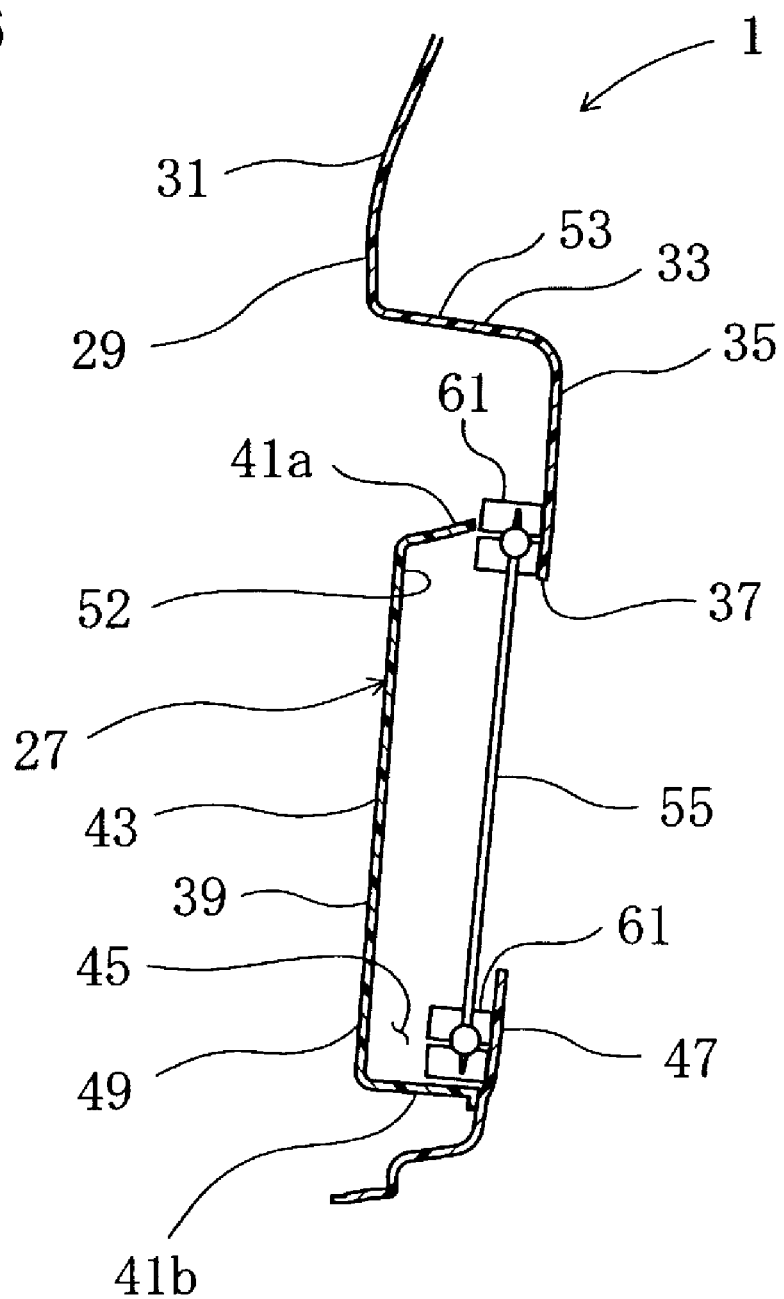
FIG. 6 is a sectional view according to the fourth embodiment, which corresponds to FIG. 3.

FIGS. 5 and 6 show the side door 1 of a vehicle to which an interior structure of a vehicle according to a fourth embodiment is applied. According to the fourth embodiment, a cylindrical retractor 59 is provided near a rear end portion of the opening 37 of the third wall portion 35 of the door trim body 29 so as to extend between the upper and lower edges of the opening 37 on the side of the vehicle outside. A pair of rails 61 is disposed near the upper and lower edges of the opening 37 so as to extend in parallel longitudinally from a slightly forward position from the center of the opening 37 to a disposition position of the retractor 59. The covering member 55 is made of a blind-shaped windable member such as a curtain or cloth. The covering member 55 can be wound up by the retractor 59 in a state in which the upper and lower ends of the covering member 55 are supported by the rail 61. Thereby, the longitudinal width of the covering member 55 is adjustable. The other structures of the present embodiment are the same as those of the above-described first embodiment, which are denoted by the same reference characters. Their detailed descriptions will be omitted here.

According to the present embodiment, since the opening width of the article storage portion 45 can be made wider by winding up the covering member 55 by the retractor 59, the facilities of the article storage portion 45 can be improved.

Embodiment 5

Figure 7:
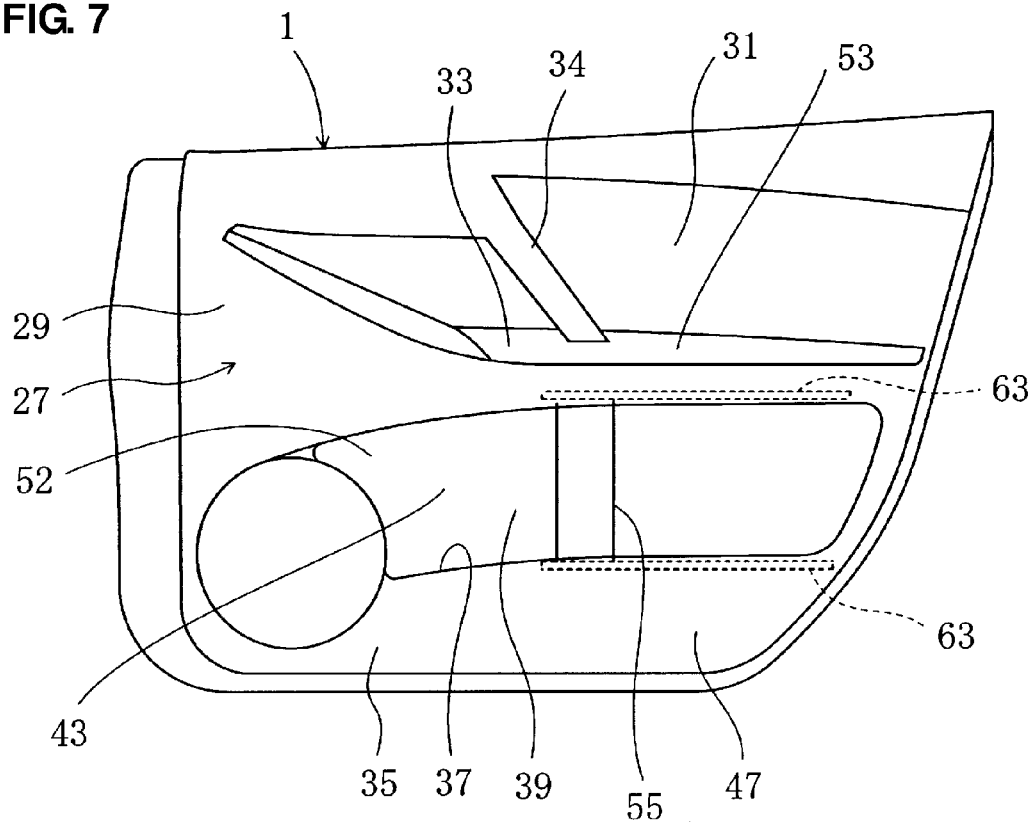
FIG. 7 is a side view according to a fifth embodiment, which corresponds to FIG. 1.
Figure 8:
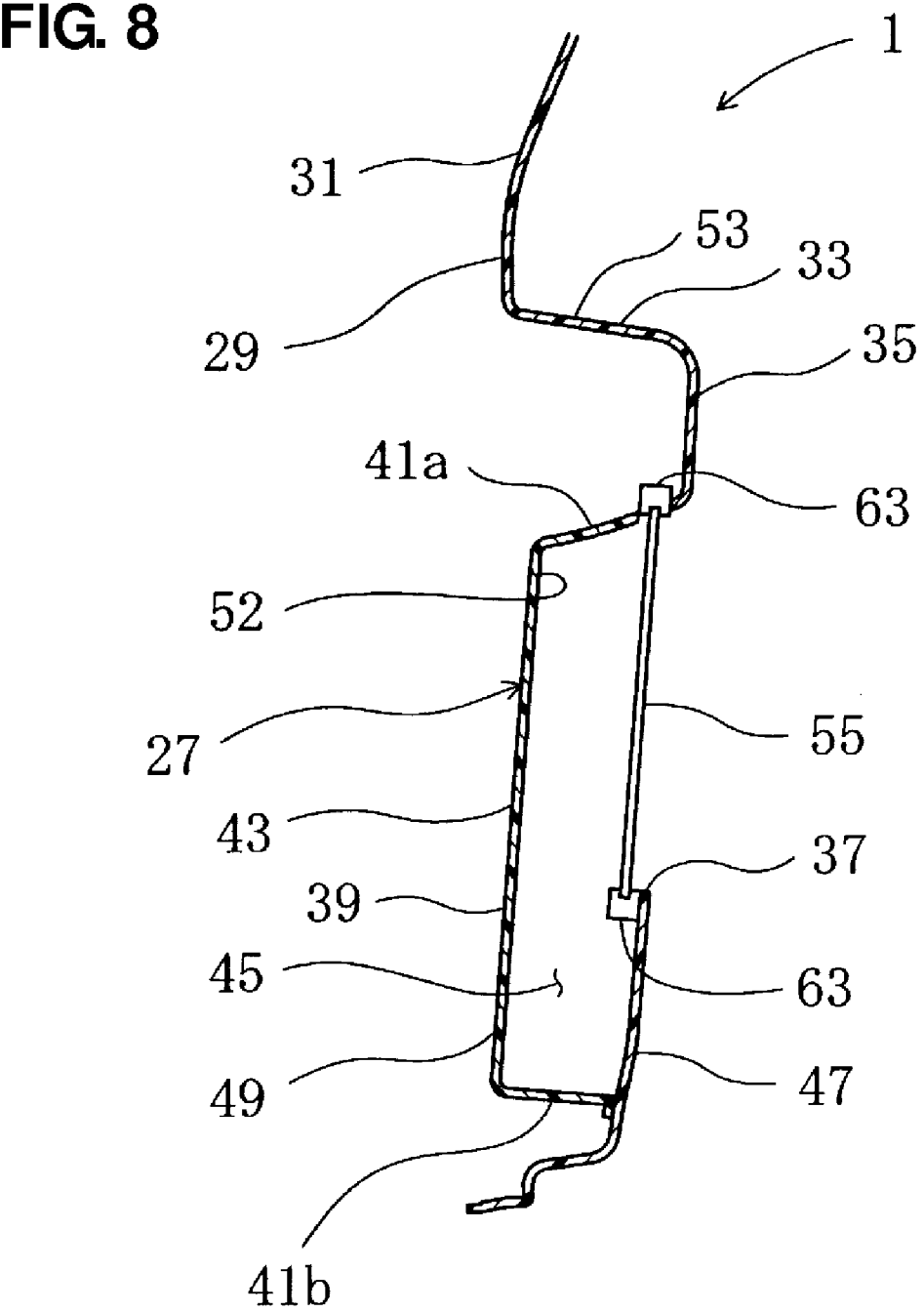
FIG. 8 is a sectional view according to the fifth embodiment, which corresponds to FIG. 3.

FIGS. 7 and 8 show the side door 1 of a vehicle to which an interior structure of a vehicle according to a fifth embodiment is applied. According to the fifth embodiment, a pair of rails 63 is disposed near the upper and lower edges of the opening 37 so as to extend in parallel longitudinally from a slightly forward position from the center of the opening 37 to a rear end position of the opening 37. The covering member 55 is formed with its width which is about one fourth of the rail 63, and movable in vehicle longitudinal direction in a state in which its upper and lower ends are supported by the rails 63. The other structures of the present embodiment are the same as those of the above-described first embodiment, which are denoted by the same reference characters. Their detailed descriptions will be omitted here.

According to the present embodiment, the passenger's protection can be surely achieved by moving the covering member 55 to a proper position to restrain the airbag 23 from coming in. Further, while the inflation position of the airbag 23 moves in the longitudinal direction as the seat 19 slides longingly, since the inflation state of the airbag 23 can be made stable by moving the covering member 55 to the position corresponding to the inflation position of the airbag 23, the article's putting in or out can be made easier with reduction of an occupying area of the covering member 55. Further, since the position of the opening of the article storage portion 45 can be changed by adjusting the move of the covering member 55, the facilities can be improved.

Embodiment 6

Figure 9:
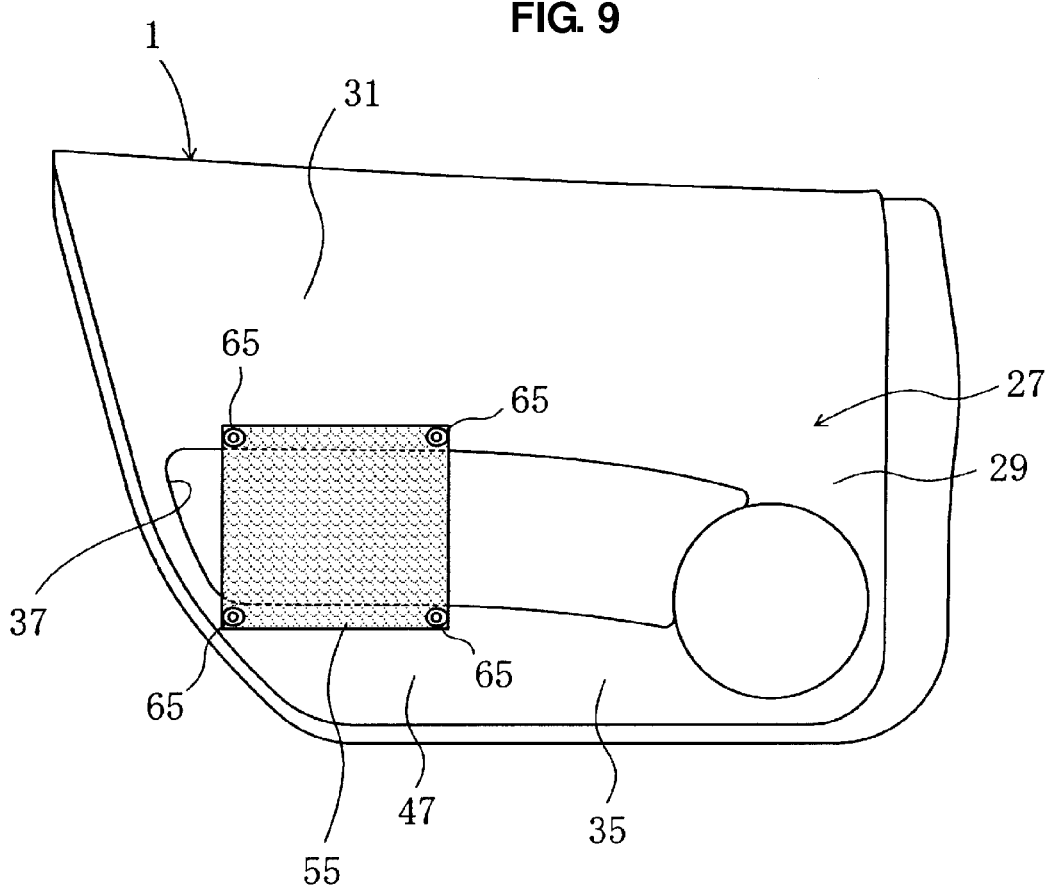
FIG. 9 is a side view of a door trim body of a vehicle to which the interior structure of a vehicle according to a sixth embodiment is applied, when viewed from a vehicle outside.
Figure 10:
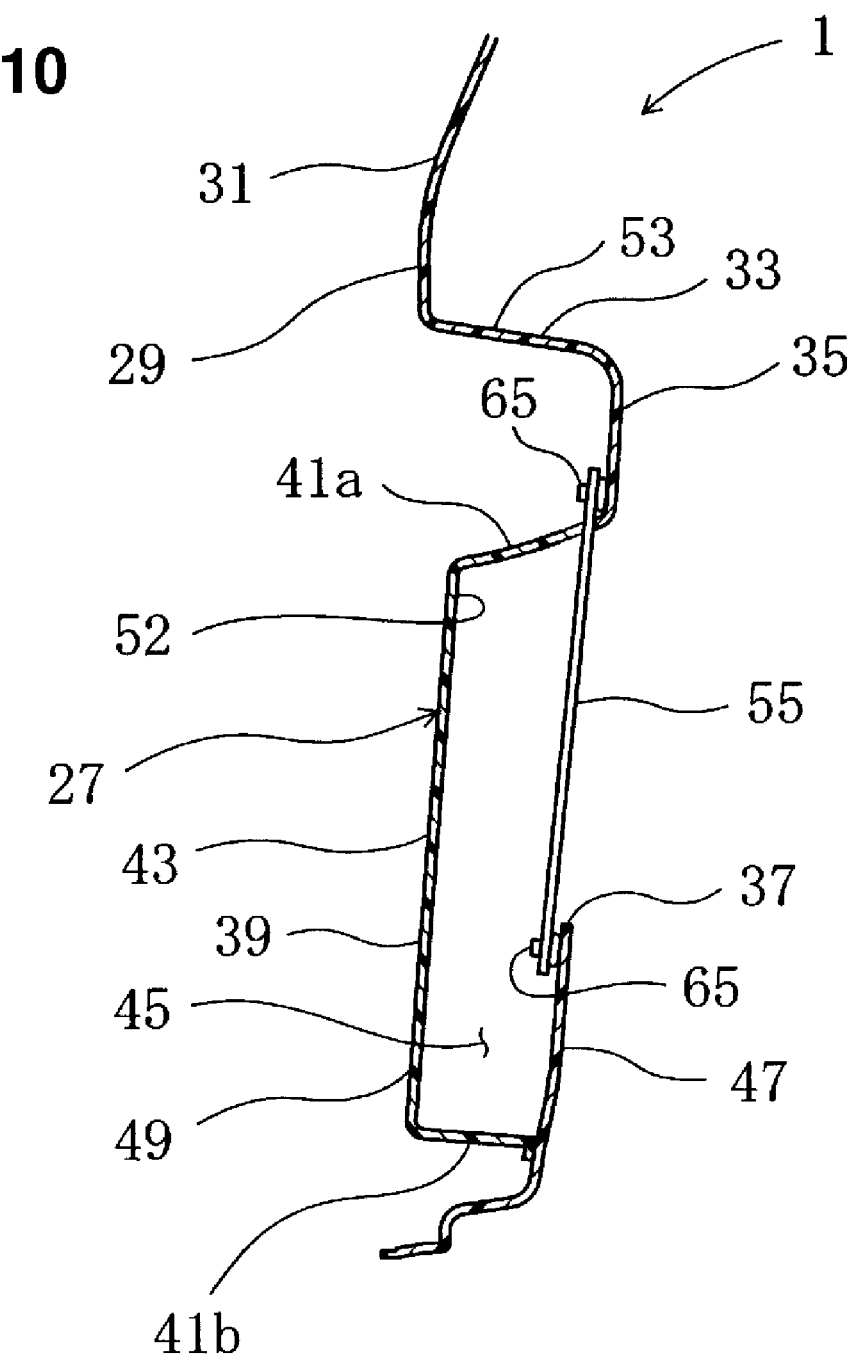
FIG. 10 is a sectional view according to the sixth embodiment, which corresponds to FIG. 3.

FIGS. 9 and 10 show the side door 1 of a vehicle to which an interior structure of a vehicle according to a sixth embodiment is applied. According to the sixth embodiment, the covering member 55 is made of a net, and the four corners of the covering member 55 are fixed to a periphery of the opening 37 of the door trim body 29 via screws 65. According to the present embodiment, since the covering member 55 is made of the net, the proper visibility of the article storage portion 45 can be ensured.

Embodiment 7

Figure 11:
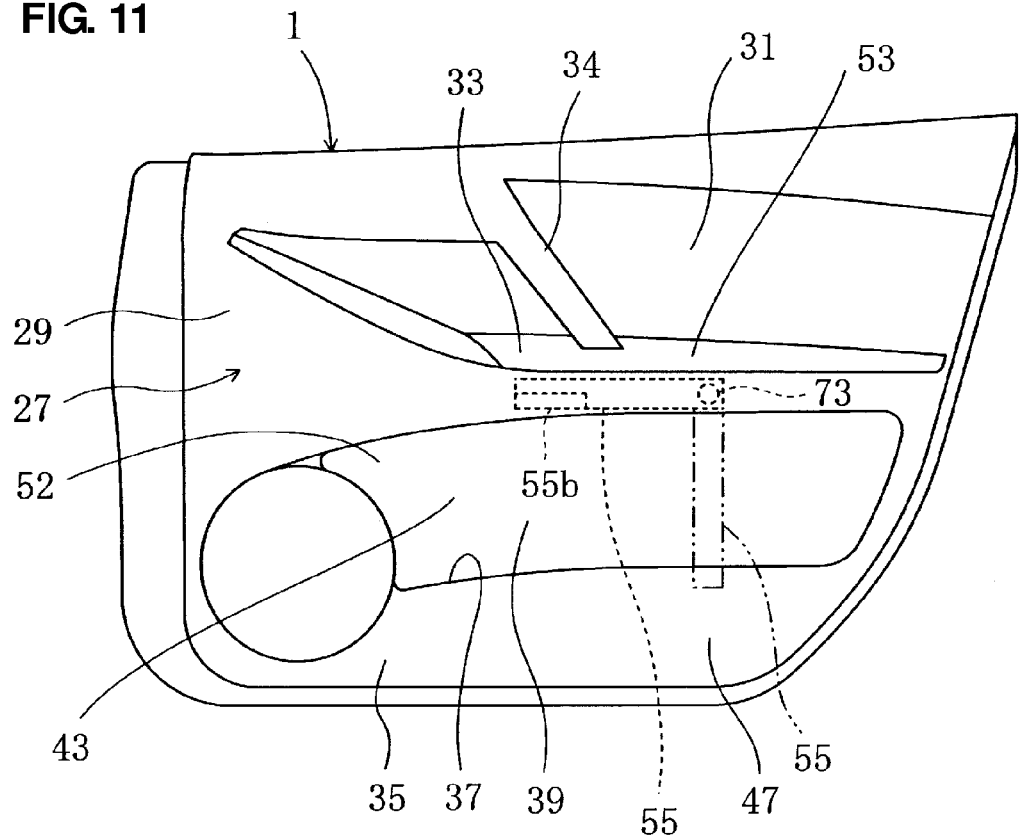
FIG. 11 is a side view according to a seventh embodiment, which corresponds to FIG. 1.
Figure 12:
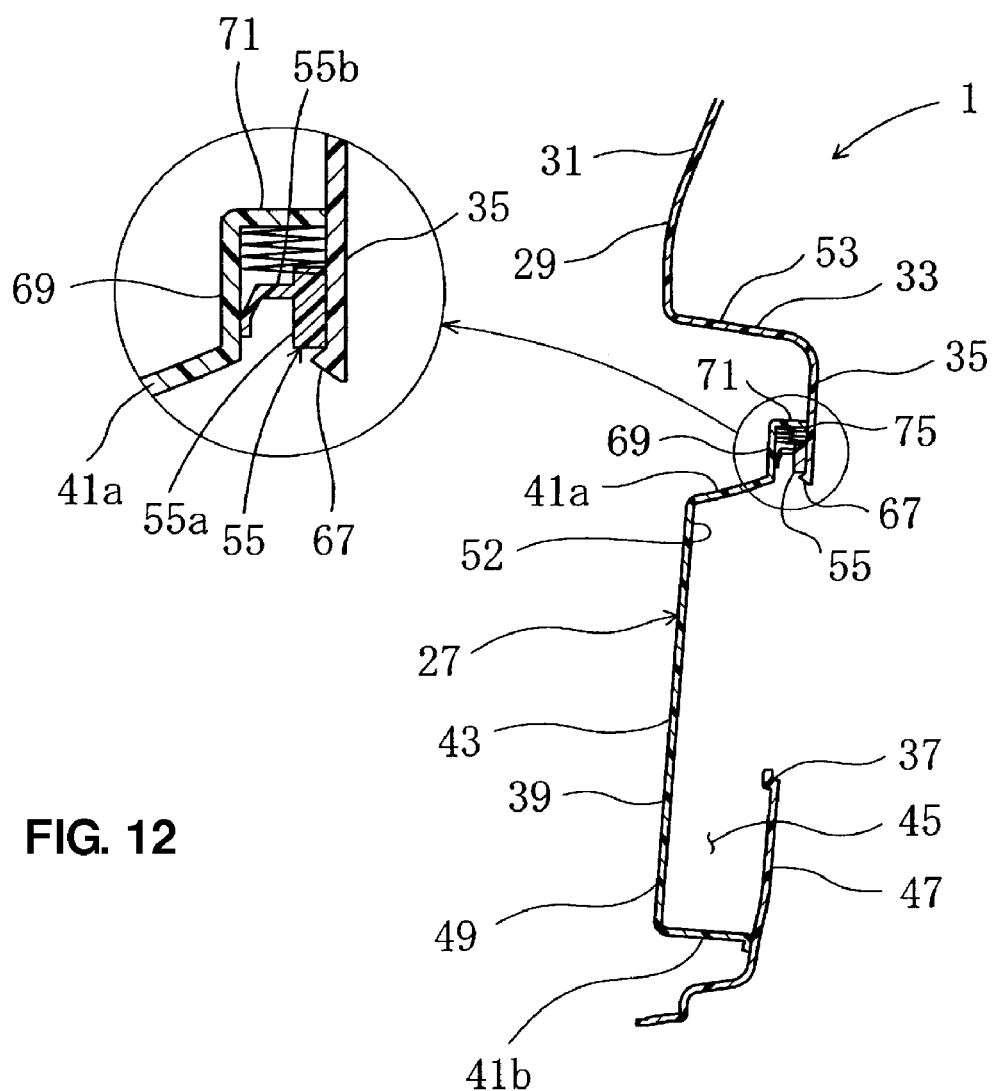
FIG. 12 is a sectional view according to the seventh embodiment, which corresponds to FIG. 3.

FIGS. 11 and 12 show the side door 1 of a vehicle to which an interior structure of a vehicle according to a seventh embodiment is applied. According to the seventh embodiment, a projection 67 which projects toward the vehicle outside is formed at the upper edge of the opening 37 of the door trim body 29 (third wall portion 35). At the vehicle-inside end of the upper wall 41*a* of the back lid portion 43 are formed a first projecting wall 69 which projects upward and a second projecting wall 71 which projects from an projection end of the first projecting wall 69 toward the vehicle inside (toward the third wall portion 35). Further, the covering member 55 is comprised of a body portion 55*a* which is of a slender plate and a weak portion 55*b* which projects in a substantially L shape from either one of faces of the body portion 55*a*.

A storage recess having an opening facing downward is formed by the upper edge of the opening 37 of the door trim body 29, the first projecting wall 69, and the second projecting wall 71. The covering member 55 is stored inside a space of this storage recess. One end of the covering member 55 in its longitudinal direction is pivotally supported at around the upper edge of the opening 37 of the door trim body 29 via a hinge 73. A spring member 75 which biases the covering member 55 downward is stored inside the recess, the tip of the weak portion 55b of the covering member 55 contacts the first projecting wall 69 of the back lid portion 43, and the body portion 55a of the covering member 55 engages with the projecting portion 67 for prevention of its dropping.

According to the present interior structure of a vehicle as described above, the weak portion 55b of the covering member 55 is broken by the impact from the vehicle side crash, and the engagement of the projecting portion 67 of the covering member 55 is released. Then, the covering member 55 is rotated around the hinge 73 and the other end of the covering member 55 moves to the vicinity of the lower edge of the opening 37 of the door trim body 29, so that the covering member 55 covers over part of the recess 52. Thereby, a lower portion of the inflating airbag 23 contacts the covering member 55 so that the covering member 55 holds the airbag 23 from the vehicle inside. Thus, the airbag 23 can be prevented from fluttering in the vehicle width direction, and the inflating airbag 23 can be prevented from coming into the article storage portion 45, so that the inflation state of the airbag 23 can be stable and the move of the passenger toward the vehicle outside can be prevented. According to the present embodiment, since the covering member 55 does not cover over the recess 52 above the article storage portion 45 while the airbag does not inflate, the article's putting into the article storage portion 45 or out of the article storage portion 45 is not prevented by the covering member 55 and made easier.

Embodiment 8

Figure 13:
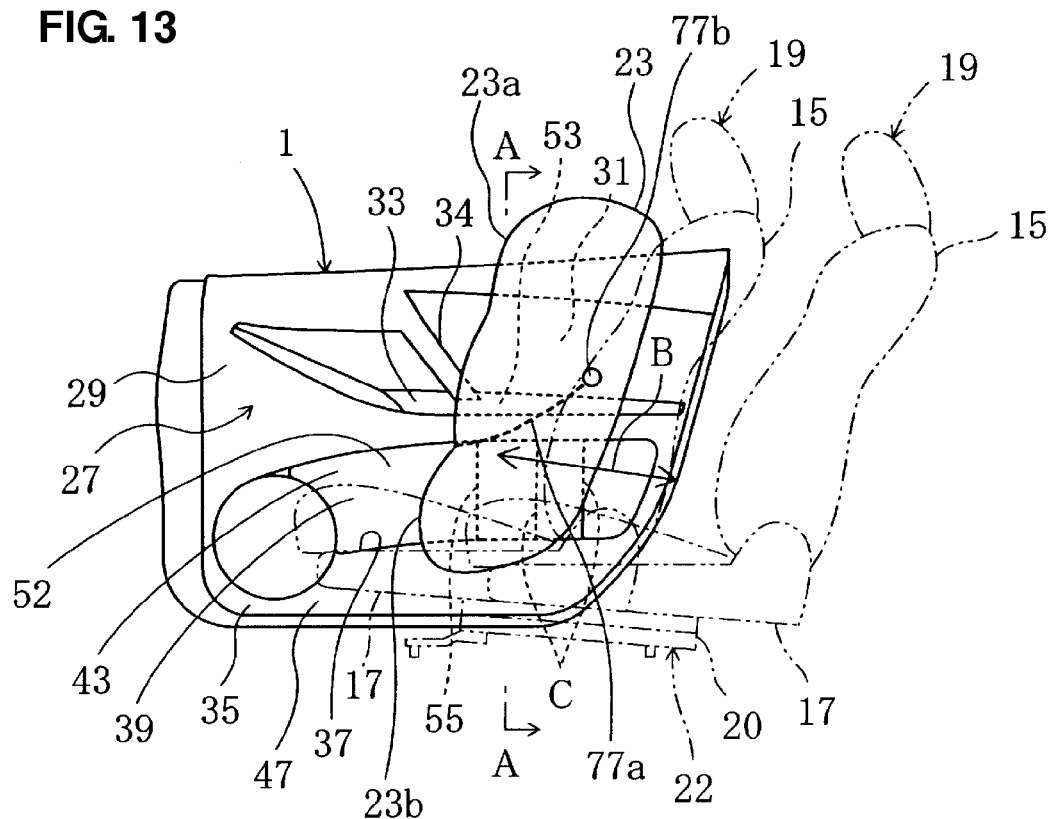
FIG. 13 is a side view according to an eighth embodiment, which corresponds to FIG. 1.
Figure 14:
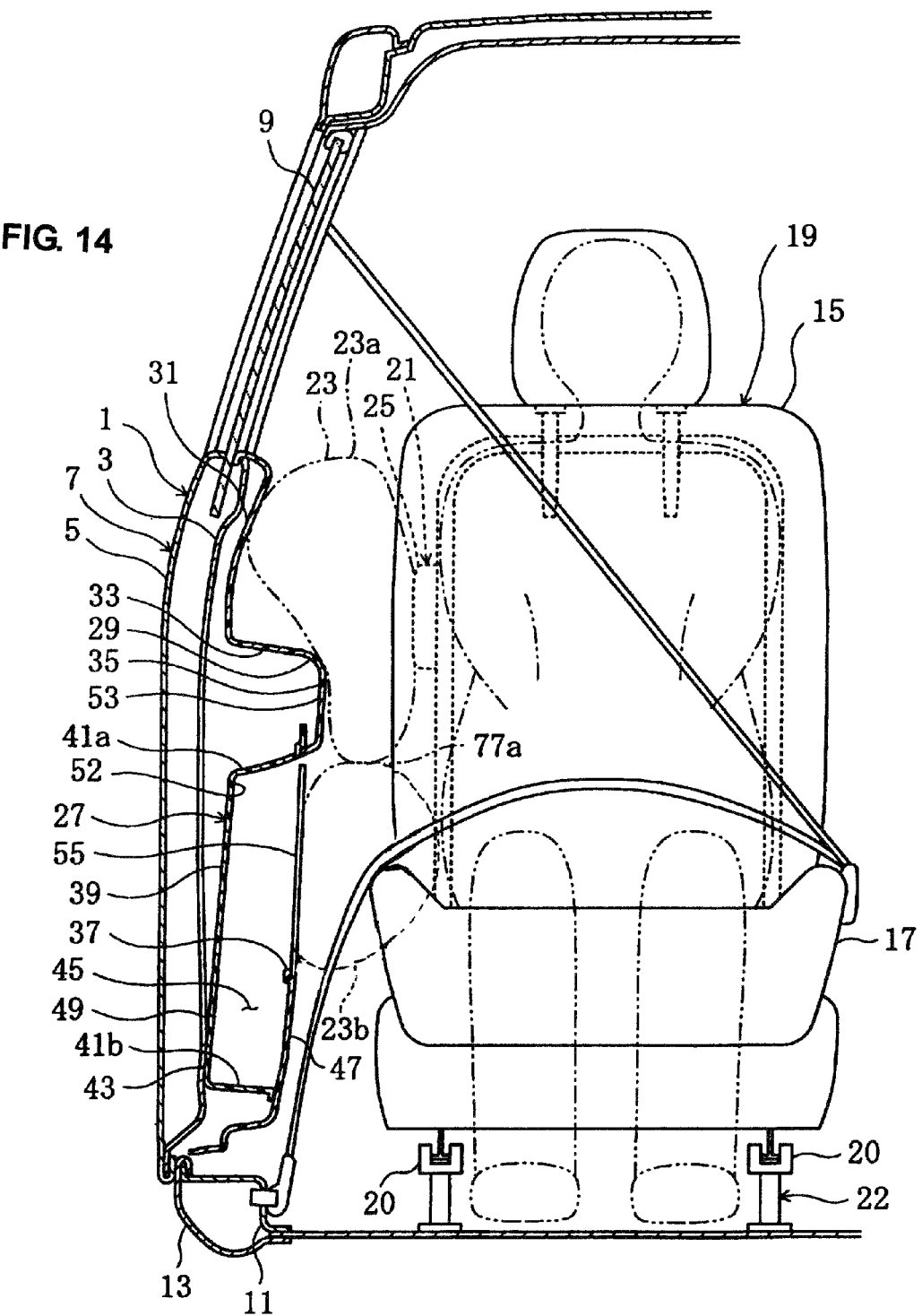
FIG. 14 is a sectional view according to the eighth embodiment, which corresponds to FIG. 2.

FIG. 13 shows the side door 1 of a vehicle to which an interior structure of a vehicle according to an eighth embodiment is applied. According to the eighth embodiment, the airbag 23 comprises a chest-protecting portion 23a and a waist-protecting portion 23b which are separated by a separating portion 77a which is made of stitches and formed so as to extend from the front end of a middle portion of the airbag 23 in the vertical direction toward a central portion of the airbag 23 in the longitudinal direction. The separating portion 77a is configured such that the waist-protecting portion 23b inflates at a location which is positioned below the armrest 53. Further, a non-inflatable portion 77b is formed at the rear end of the separating portion 77a. Herein, the airbag 23 may be separated into the chest-protecting portion 23a and the waist-protecting portion 23b via the adhesive or other means in place of the stitches. The other structures of the present embodiment are the same as those of the above-described first embodiment, which are denoted by the same reference characters. Their detailed descriptions will be omitted here.

According to the present embodiment, since the airbag 23 is separated by the separating portion 77a and the inflator 25 is disposed so as to emit the gas downward, namely toward the inside of the waist-protecting portion 23b, the waist-protecting portion 23b, which is important for the protection of the seated passenger, inflates before the chest-protecting portion 23a inflates at the vehicle side crash. Accordingly, the passenger can be protected more surely.

Herein, while the article storage portion 45 at the lower portion of the door trim 27, namely the door pocket, is provided as the vehicle-equipment portion in the above-described first through eighth embodiments, the vehicle-equipment portion is not limited to the article-storage portion 45. For example, a hook for hanging goods or an onboard switch may be provided as the vehicle-equipment portion instead of the article storage portion 45. Further, the impact absorbing member may be provided on the vehicle-outside of the vehicle-equipment portion (between the inner panel 3 and the outer panel 5).

Further, the interior structure according to the above-described first through eighth embodiments can be also applied to a front left set and side door in place of the front right seat 19 and side door 1. Moreover, while the covering member 55 is provided at the position which is not away from the article storage portion 45 according to the above-described first through eighth embodiments, as long as the support function of the airbag 23 can be properly performed when the airbag 23 inflates, the covering member 55 may be located away from the upper portion of the article storage portion 45. Further, the forming location of the recess 52 may be positioned away from the article storage portion 45 as long as it is positioned above the article storage portion 45 of the door trim 27.

While the airbag 23 of the above-described first through eighth embodiments is configured to protect the chest and waist portions of the passenger seated, the airbag is configured to protect only the waist portion of the passenger. While the covering member 55 of the above-described first through third and eighth embodiments is configured to extend continuously from the inside wall 47, it may be formed to be detachable. While the width of the covering member 55 of the above-described first and eighth embodiments is configured to be almost a half of the width of the recess 52, the covering member 55 may has any width as long as the covering member can cover over at least of part of the recess 52. For example, the short width as illustrated by a broken line C in FIG. 1 can be applied.

Further, the covering member 55 of the above-described sixth embodiment may be comprised of a member, such as a shutter, which can extend in one of two directions which are perpendicular to the face but not extend in the other direction. In this case, the airbag 23 can be prevented properly from fluttering in the vehicle width direction, the covering member 55 can be expanded toward the vehicle inside when any article is putted into the article storage portion 45, thereby making the article's pitting in or out easier. The covering member may be configured of a resin shutter member. The fixing of the covering member 55 at its four corners may be conducted by using rivets or fasters, not limited to the screws 65.

Embodiment 9

Figure 15:
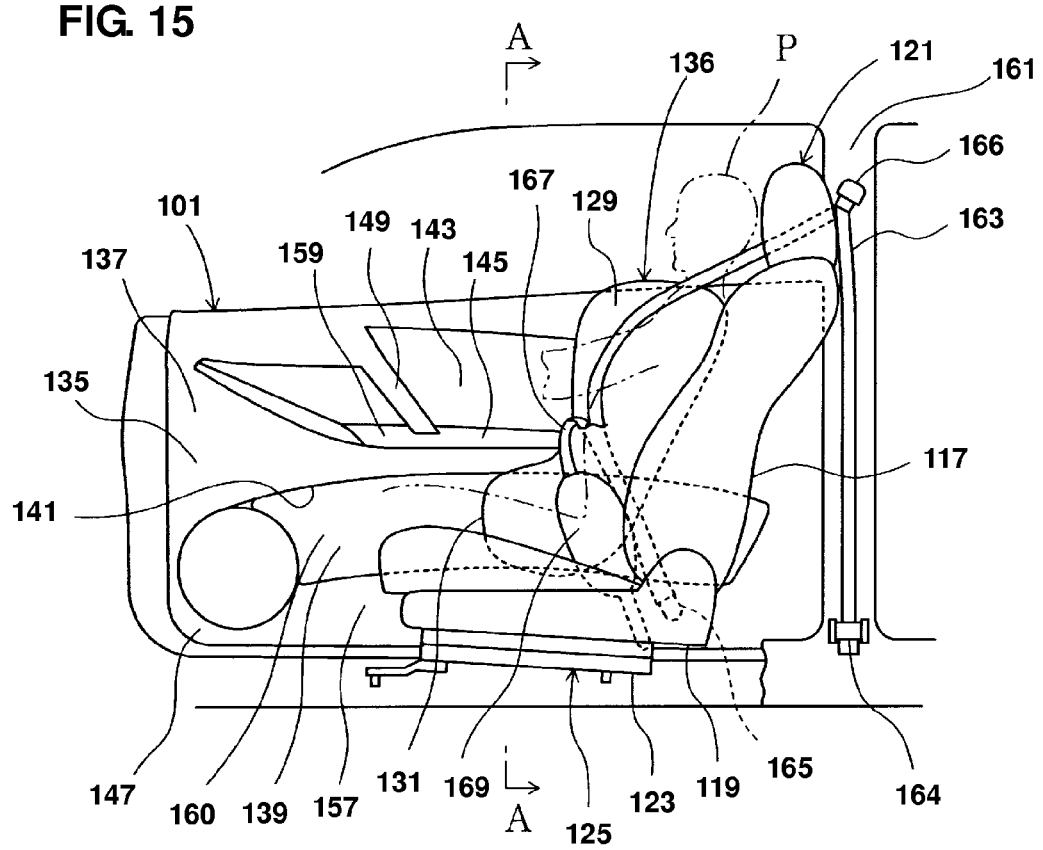
FIG. 15 is a side view of a side door of a vehicle to which an interior structure of a vehicle according to a ninth embodiment is applied, when viewed from a vehicle inside.
Figure 16:
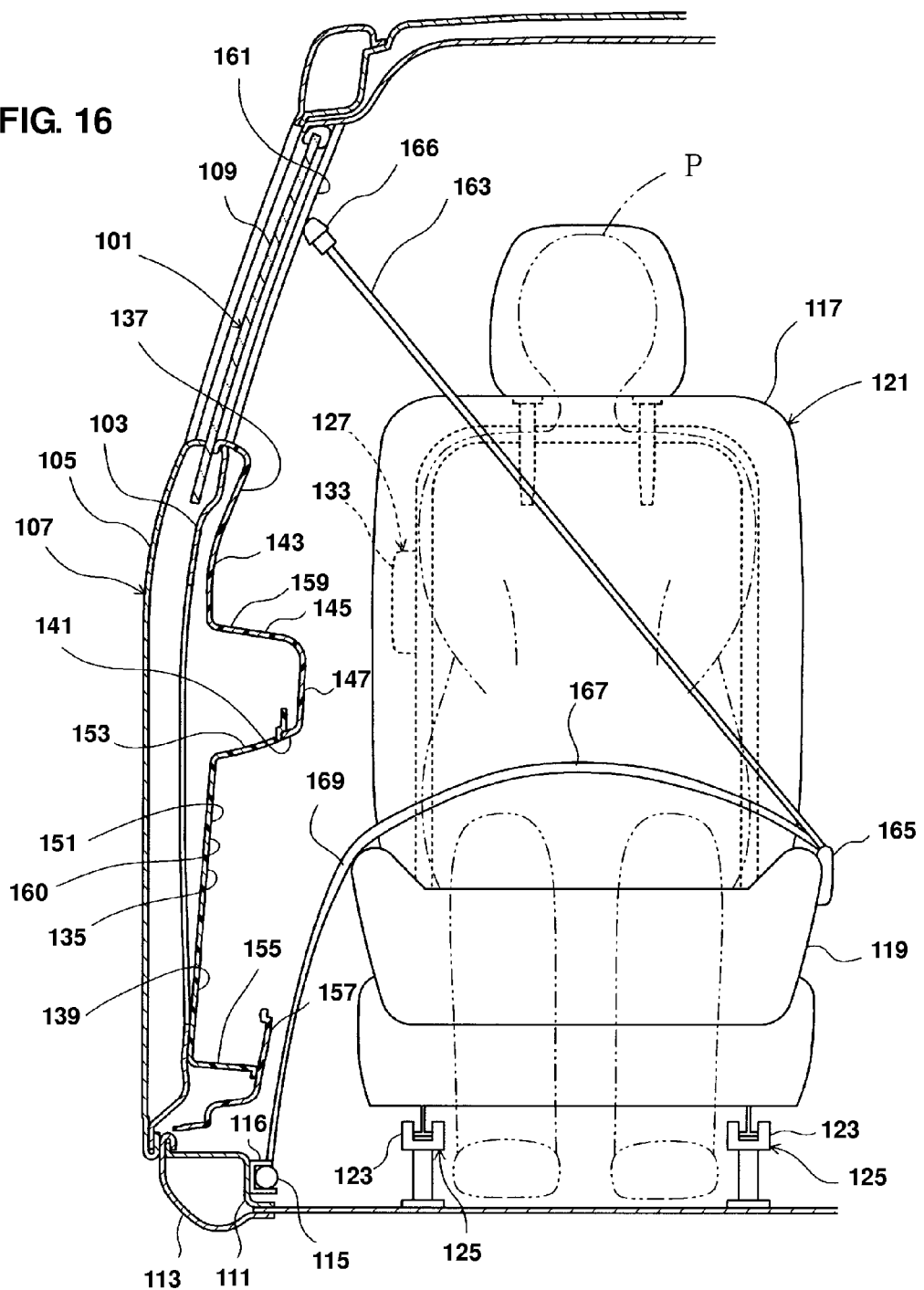
FIG. 16 is a sectional view taken along line A-A of FIG. 15 at a normal state.
Figure 17:
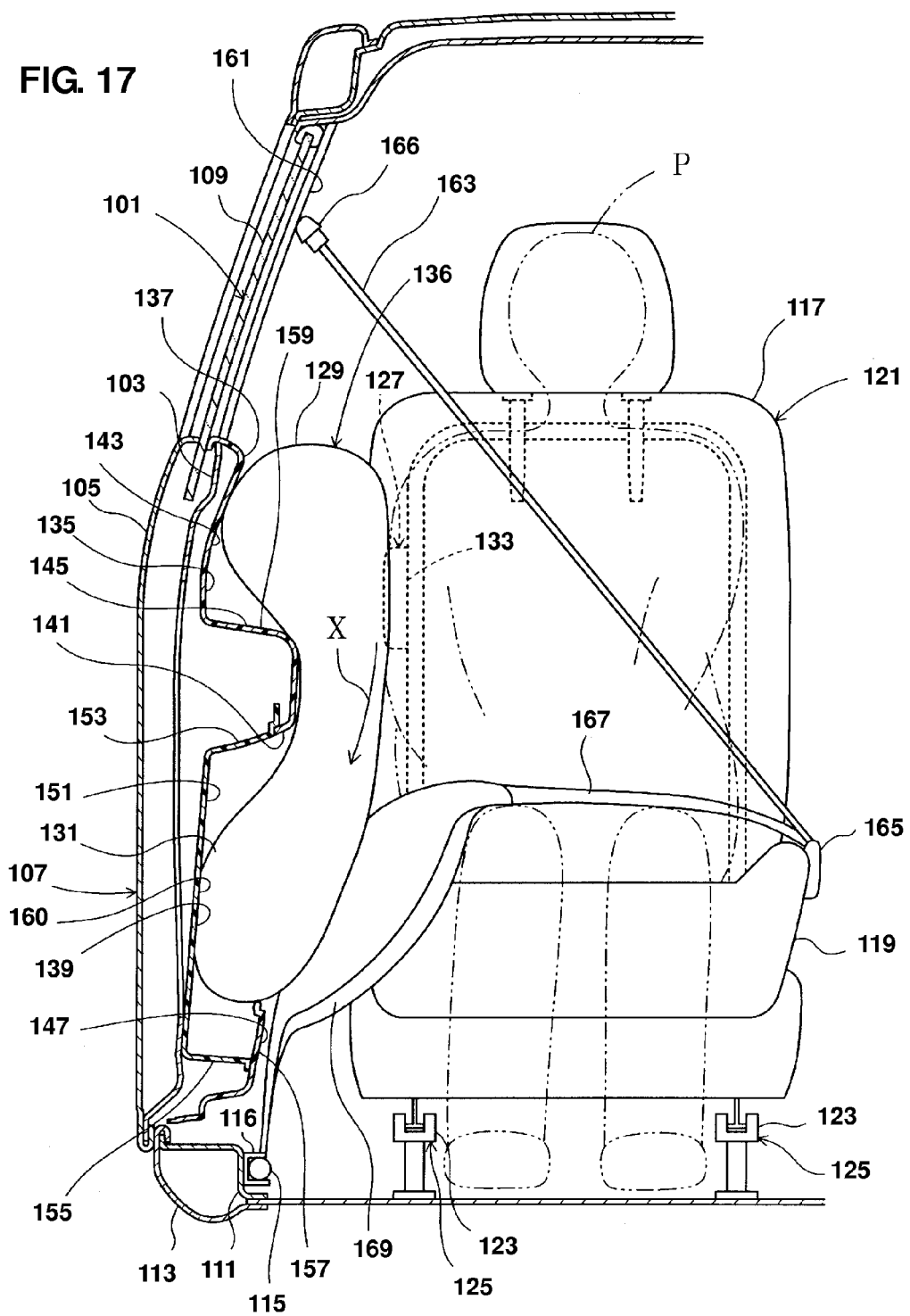
FIG. 17 is a sectional view taken along line A-A of FIG. 15 when an airbag inflates.

FIG. 15 shows a side door 101 of a vehicle to which an interior structure of a vehicle according to a ninth embodiment is applied. This side door 101, which is a front right side door of an automotive vehicle, comprises a door body 107 which includes an inner panel 103 and an outer panel 105 which are made from metal as shown in FIGS. 16 and 17. A window glass 109 is provided at an upper portion of the door body 107, and a side sill inner 111 and a side sill outer 113, which are made from metal, extend in a vehicle longitudinal direction at a lower portion of the door body 107. At the side sill inner 111 is provided a cylindrical inflator for air belt 115 which supplies gas toward the vehicle inside at the vehicle side crash via an attaching bracket 116 in such a manner that the inflator 115 extends substantially horizontally in the vehicle longitudinal direction.

Further, a front right seat 121 which comprises a seatback 117 and a seat cushion 119 is arranged inside the vehicle so that the seat 121 and the side door 101 are overlapped when viewed from the vehicle side. The seat 121 is configured to slide in the vehicle longitudinal direction by means of a slide mechanism 125 which includes a slide rail 123. A side airbag device 127 is stored in the seatback 117 at a portion near a middle right-side end of the seatback 117. The side airbag device 127 comprises an airbag 136 which inflates beside the seat 121, namely between the side door 101 and a passenger P seated in the seat 121. The airbag 136 is formed by two sheets of cloth which are sewed at their peripheries. An upper portion of the airbag 136 constitutes a chest-protecting airbag 129 which protects a chest portion of the seated passenger P, and a lower portion of the airbag 136 constitutes a waist-protecting airbag 131 which protects a waist portion of the seated passenger P. These chest-protecting airbag 129 and waist-protecting airbag 131 inflate with gas supplied from an inflator 133 which is common to these airbags. The inflator for side airbag 133 is disposed so as to emit the gas into the waist-protecting airbag 131, that is, downward (in a direction shown by an arrow X in FIG. 17). Herein, while the airbag 136 is stored inside the seatback 117 in its folded state, the airbag 136 in such a state is not illustrated.

The door body 107 is covered with a door trim 135 which is made from resin from the vehicle inside, and the door trim 135 comprises a door trim body 137. An opening 141 of the door trim body 137 is covered with a back lid portion 139 in a state in which its opening faces to the vehicle inside. The door trim body 137 comprises a first wall portion 143 which forms an upper portion of the door trim body 137, a second wall portion 145 which extends inwardly from a lower edge of the first wall portion 143, and a third wall portion 147 which extends downward from a vehicle inside edge of the second wall portion 145. The second wall portion 145 extends forward so as to slant upward, and a grip portion 149, which is to be held by the passenger when the side door 101 is operated, is provided so as to slant upward from a middle portion of the second wall portion 145 in the vehicle longitudinal direction. Further, the above-described opening 141 is formed at a middle portion of the third wall portion 147.

The back lid portion 139 comprises a substantially-rectangular vertical wall 151, an upper wall 153 and a bottom wall 155 which are provided above and below the vertical wall 139. The bottom wall 155 extends below a lower end edge of the opening 141, and a vehicle-inside tip edge of the bottom wall 155 contacts the third wall portion 147. Herein, an article storage portion 157 is formed by the vertical wall 151 of the back lid portion 139, a specified portion of the third wall portion 147 which faces to the vertical wall 151 in the vehicle width direction, and the bottom wall 155 which interconnects the vertical wall 151 and the third wall portion 147. Further, an armrest 159 which projects toward the vehicle inside is formed by the second wall portion 145, the third wall portion 147, and the upper wall 153 of the back lid portion 139, namely the door trim 135 above the article storage portion 157. Moreover, a recess 160 which is concaved toward the vehicle outside is formed between the article storage portion 157 and the armrest 159.

Further, a pillar trim 161 extends vertically in back of the windshield 109, a retractor 164 is disposed at a lower portion of the pillar trim 161, and one end of a seatbelt 163 is coupled to the retractor 164 to be wound up by this retractor 164. This seatbelt 163, which restrains the move of the seated passenger P at the vehicle crash, extends upward from the retractor 164 along the pillar trim 161 and then extends through a guide 166 which is disposed at an upper portion of the pillar trim 161. The seatbelt 163 which is positioned on the anti-side of the retractor 164 relative to the guide 166 extends through a through hole of a tongue, not illustrated, which is detachably attached to the buckle device 165 that is disposed on the left of the seat cushion 119 of the seat 121. The other end of the seatbelt 163 (on the anti-side of the retractor 164) is connected to one end of the inflator for air belt 115 which is on the side of the vehicle inside. A portion of the seatbelt 163 which is located between its end portion on the side of the inflator for air belt 115 and the above-described tongue constitutes a lap-belt portion 167 which holds the waist portion of the seated passenger P. A half part of the outside portion of the lap-belt portion 167 constitutes an air belt 169 which inflates with the gas supplied from the inflator for air belt 115 at the vehicle side crash.

While the inflator for air belt 115 and the inflator for side airbag 133 are controlled so as to inflate almost at the same time according to the detection of the vehicle side crash by a side-crash sensor, the gas volume which is supplied by the inflator for air belt 115 is set to be smaller than that by the inflator for side airbag 133. Accordingly, the air belt 169 of the seatbelt 163 inflates up to its maximum inflation state after the chest-protecting airbag 131 of the side airbag device 127 does.

According to the interior structure of a vehicle described above, the inflator for side airbag 133 supplies the gas to the chest-protecting airbag 129 and the waist-protecting airbag 131 and the inflator for air belt 115 also supplies the gas to the waist-protecting airbag 169 at the vehicle side crash according to the detection by the side-crash sensor. Thereby, as shown in FIG. 17, the chest-protecting portion 129 inflates between the door trim 135 and the chest portion of the seated passenger P, and the waist-protecting airbag 131 and the air belt 169 inflate, as shown in FIG. 15, at a location between the door trim 135 (recess 160) which is positioned above the article storage portion 157 and below the armrest 159 and the waist portion of the seated passenger P in such a meaner that these airbag 131 and air belt 169 are overlapped when viewed from the vehicle side. Herein, the air belt 169 inflates on the side of the seated passenger P relative to the waist-protecting airbag 131. Thereby, the move of the waist portion of the seated passenger P toward the vehicle outside can be further restrained by the air belt 169 in addition to the waist-protecting airbag 131. Further, since the space between the door trim 135 above the article storage portion 157, namely the recess 160 and the seated passenger P is properly occupied by the air belt 169 and the waist-protecting airbag 131 even if the space becomes large, the waist-protecting airbag 131 can be restrained from fluttering in the vehicle width direction. Consequently, the move of the passenger P can be surely restrained. Accordingly, both making the article storage portion 157 properly large and protecting the passenger P can be achieved properly.

According to the present embodiment, since the gas is supplied to the air belt 169 from the inflator for air belt 115, the belt length of the lap-belt portion 167 can be shortened without the pre-tensioner mechanism, thereby performing the function of a lap pre-tensioner function.

Further, since the air belt 169 of the seatbelt 163 inflates up to its maximum inflation state after the waist-protecting airbag 131 of the side airbag device 127 does, any improper interference of the air belt 169 which inflates at the vehicle side crash with the waist-protecting airbag 131 can be properly avoided. Thus, since the waist-protecting airbag 131 is more important than the air belt 169, the passenger P can be protected more surely.

Embodiment 10

Figure 18:
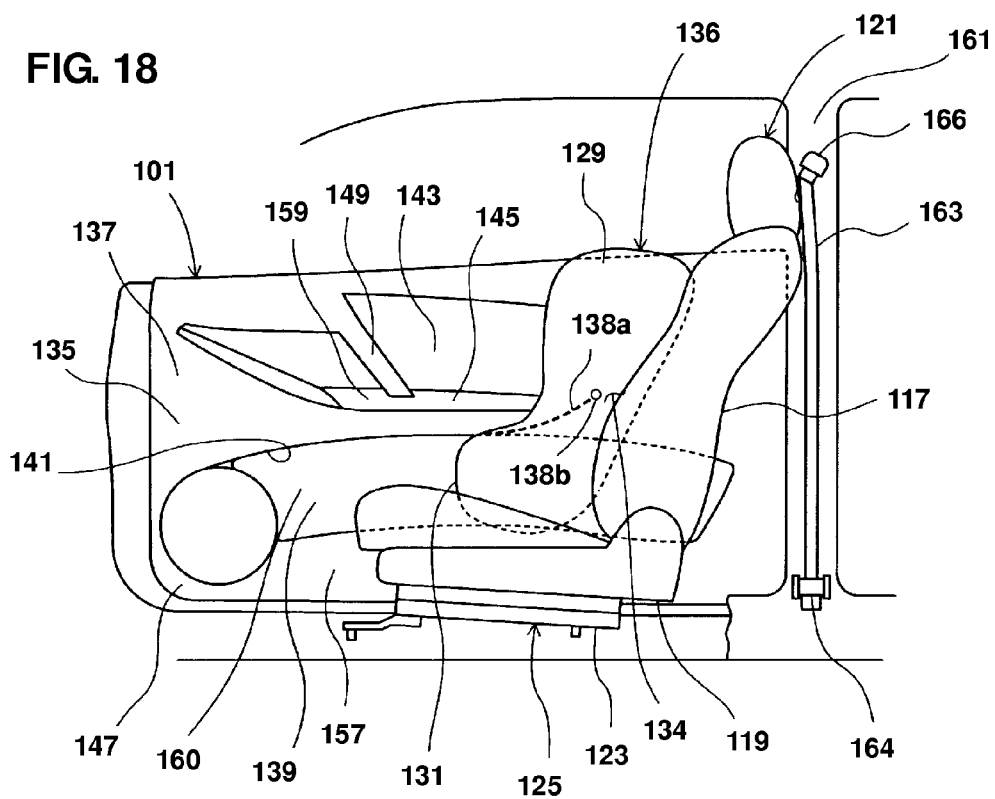
FIG. 18 is a side view according to a tenth embodiment, which corresponds to FIG. 15.

FIG. 18 shows the side door 101 of the vehicle to which an interior structure of a vehicle according to a tenth embodiment is applied. An illustration of a part of the seatbelt 163 which is located in front of the guide 166 is omitted in this figure. According to the present embodiment, a separating portion (connecting portion) 138a is made of stitches which extend from a front end of the border of the chest-protecting airbag 129 and the waist-protecting airbag 131 to its middle portion. That is, the chest-protecting airbag 129 and the waist-protecting airbag 131 of the airbag 136 of the side airbag device 127 are separated by the separating portion 138a. Further, a non-inflatable portion 138b is formed at the rear end of the separating portion 138a. Moreover, a portion behind this non-inflatable portion 138b of the border between the chest-protecting airbag 129 and the waist-protecting airbag 131 constitutes a connecting portion 134, so that these airbags 129, 131 are connected via this connecting portion 134. The other structures of the present embodiment are the same as those of the above-described sixth embodiment, which are denoted by the same reference characters. Their detailed descriptions will be omitted here.

According to the present embodiment, since the part of the border of the airbags 129, 131 are separated by the stitches and the inflator for side airbag 133 is arranged so as to emit the gas toward the inside of the waist-protecting portion 131, namely downward, the waist-protecting portion 131 which is important for the protection of the seated passenger P inflates at the vehicle side crash before the chest-protecting portion 129 inflates. Accordingly, the passenger P can be protected more surely.

Herein, while the article storage portion 157 at the lower portion of the door trim 135, namely the door pocket, is provided as the vehicle-equipment portion in the above-described ninth and tenth embodiments, the vehicle-equipment portion is not limited to the article-storage portion 157. For example, a hook for hanging goods or an onboard switch may be provided as the vehicle-equipment portion instead of the article storage portion 157.

Further, the interior structure according to the above-described ninth and tenth embodiments can be also applied to a front left set and side door in place of the front right seat 121 and side door 101. While the gas volumes supplied from the inflator for air belt 115 and the inflator for side airbag 133 are set to be different from each other in the above-described ninth and tenth embodiments, they may be set to be equal and the inflator for side airbag 133 may be configured to start supplying the gas before the inflator for air belt 115 does so that the air belt 169 inflates up to its maximum inflation state after the waist-protecting airbag 131.

While the half part of the outside portion of the lap-belt portion 167 constitutes the air belt 169 in the above-described ninth and tenth embodiments, the air belt 169 may be constituted by a narrower part of the outside portion the lap-belt portion 167 or a whole part of the lap-belt portion 167. Further, while the chest-protecting airbag 129 and the waist-protecting airbag 131 are interconnected and the gas is supplied to these airbags 129, 131 from the common inflator 133 in the above-described ninth embodiment, these airbags 129, 131 may be configured not to be interconnected and the gas is supplied to these separately from different inflators.

Embodiment 11

Figure 19:
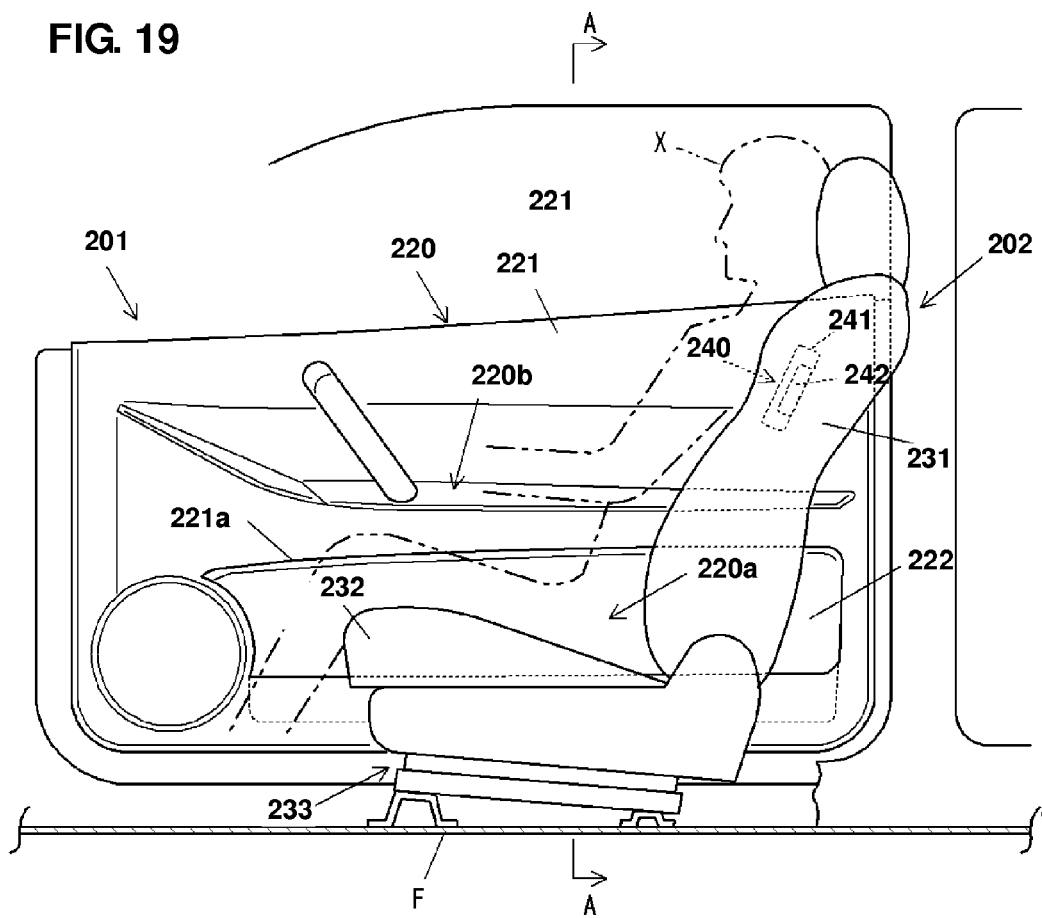
FIG. 19 is a side view of an interior structure of a vehicle according to an eleventh embodiment of the present invention, when viewed from the vehicle inside.

FIG. 19 is a side view of a front portion of a vehicle to which an interior structure of a vehicle according to the present embodiment is applied. A side door 201 for passenger's ingress and egress is provided at a vehicle side portion. Further, a seat 202 for a passenger is disposed beside the side door 201. In FIG. 19, a front right side door and a front right seat are shown as an example.

Figure 20:
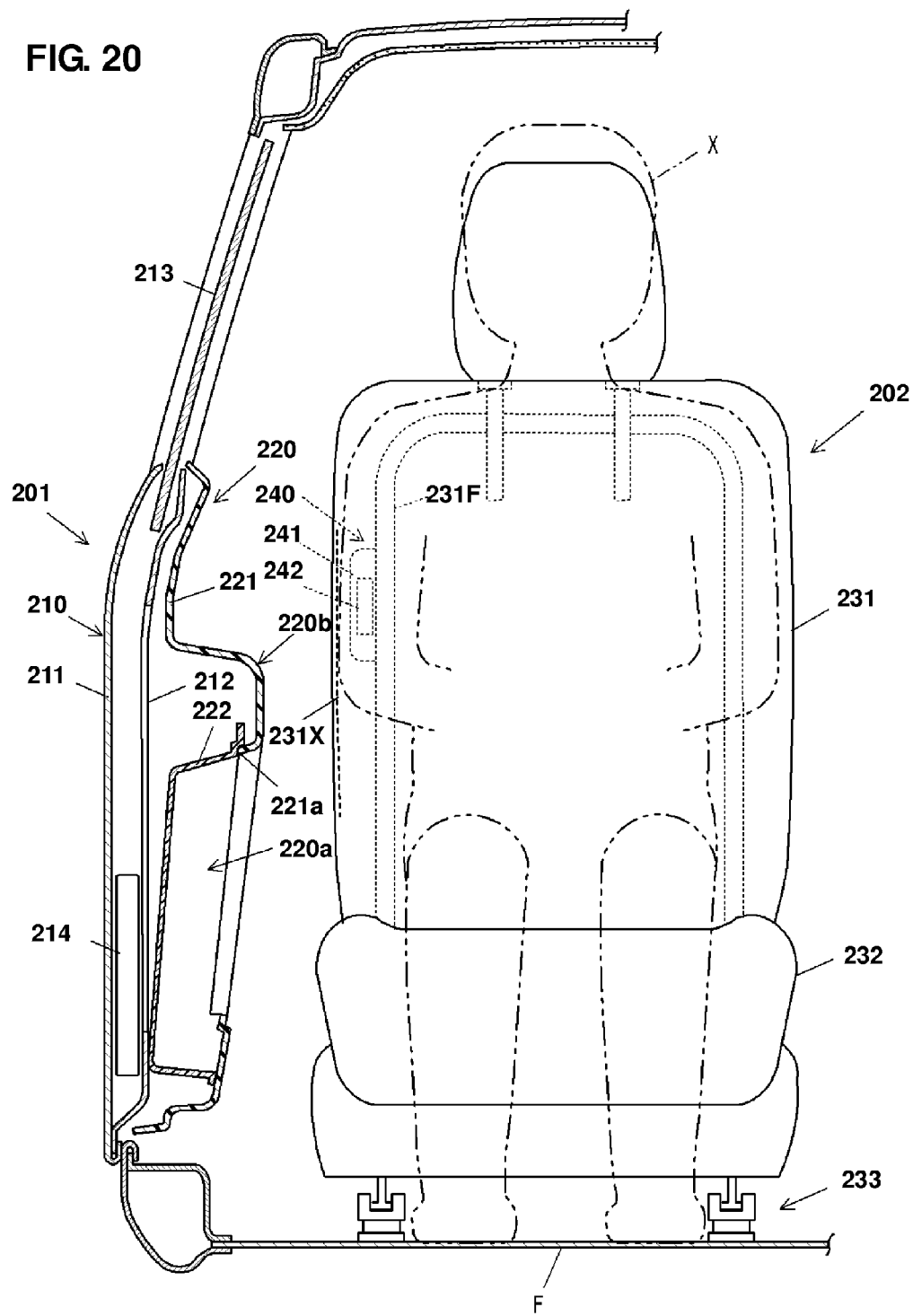
FIG. 20 is a sectional view taken along line A-A of FIG. 19 (a seat illustrated by an elevation view, not a sectional view).

As shown in FIG. 20, the side door 201 comprises a hole door body 210 which is formed by an inner panel 211 and an outer panel 212 which are made from metal, a side window glass 213 which is disposed at an upper portion of the door body 210 so as to be stored inside the door body 210 via a drive mechanism, and a resin-made door trim 220 which forms the inside face (inner face) of the side door 201. A small-sized impact absorbing member 214 which has a relatively-small thickness is disposed at a lower portion in a space between the inner panel 211 and the outer panel 212.

As shown in FIGS. 19 and 20, the door trim 220 comprises a door trim body 221 which has a substantially rectangular opening 221a which extends in the vehicle longitudinal direction at its lower portion, and a lid member 222 which covers the opening 221a from the vehicle outside. A recess 220a which is concaved toward the vehicle outside is formed at a portion of the door trim 220 with the opening 221a. Herein, the recess 220a constitutes a storage portion 280 of any articles or the like, and this recess 220a is disposed at a level of a passenger X who is seated in the seat 202.

Further, an armrest 220b which extends in the vehicle longitudinal direction along an upper edge of the recess 220a and projects toward the vehicle inside is formed by concaving a portion of the door trim body 221 above the opening 221a toward the vehicle outside. The seat 202, which comprises a seatback 231 and the seat cushion 232, is supported on a vehicle-body floor F so as to slide in the vehicle longitudinal direction via a slide mechanism 233 and the like, thereby providing an appropriate driving regardless of the size of the passenger seated.

Figure 21:
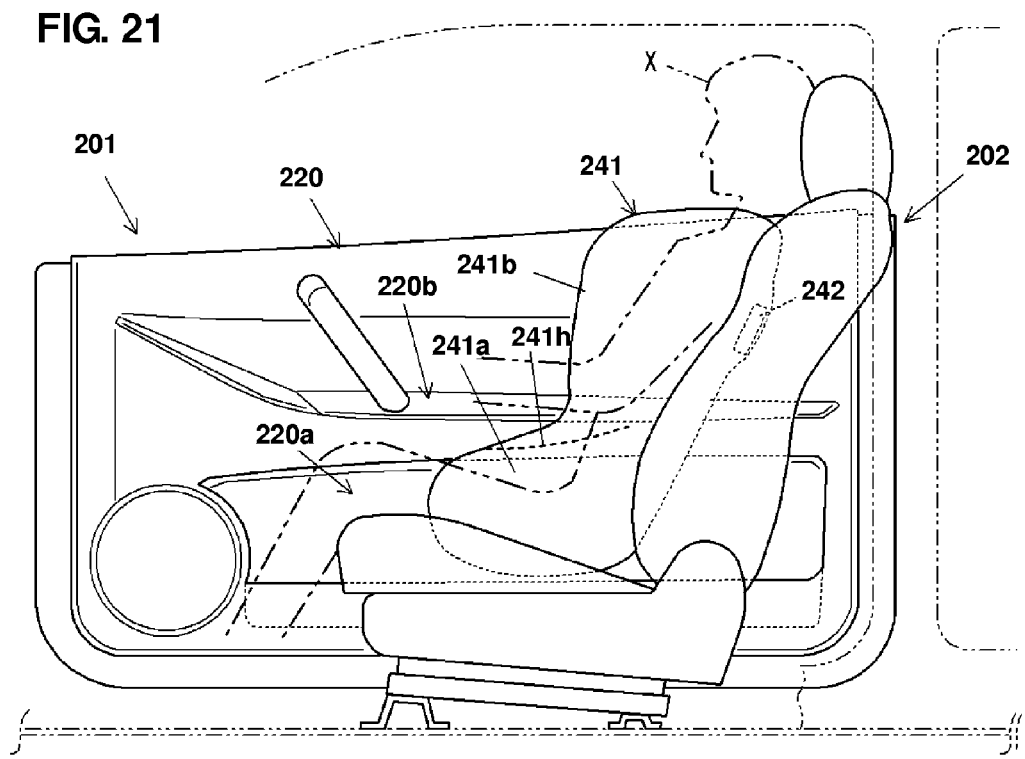
FIG. 21 is a side view of the interior structure with an airbag inflating, which corresponds to FIG. 19 (a vehicle body and others illustrated by two-dotted broken lines).
Figure 22:
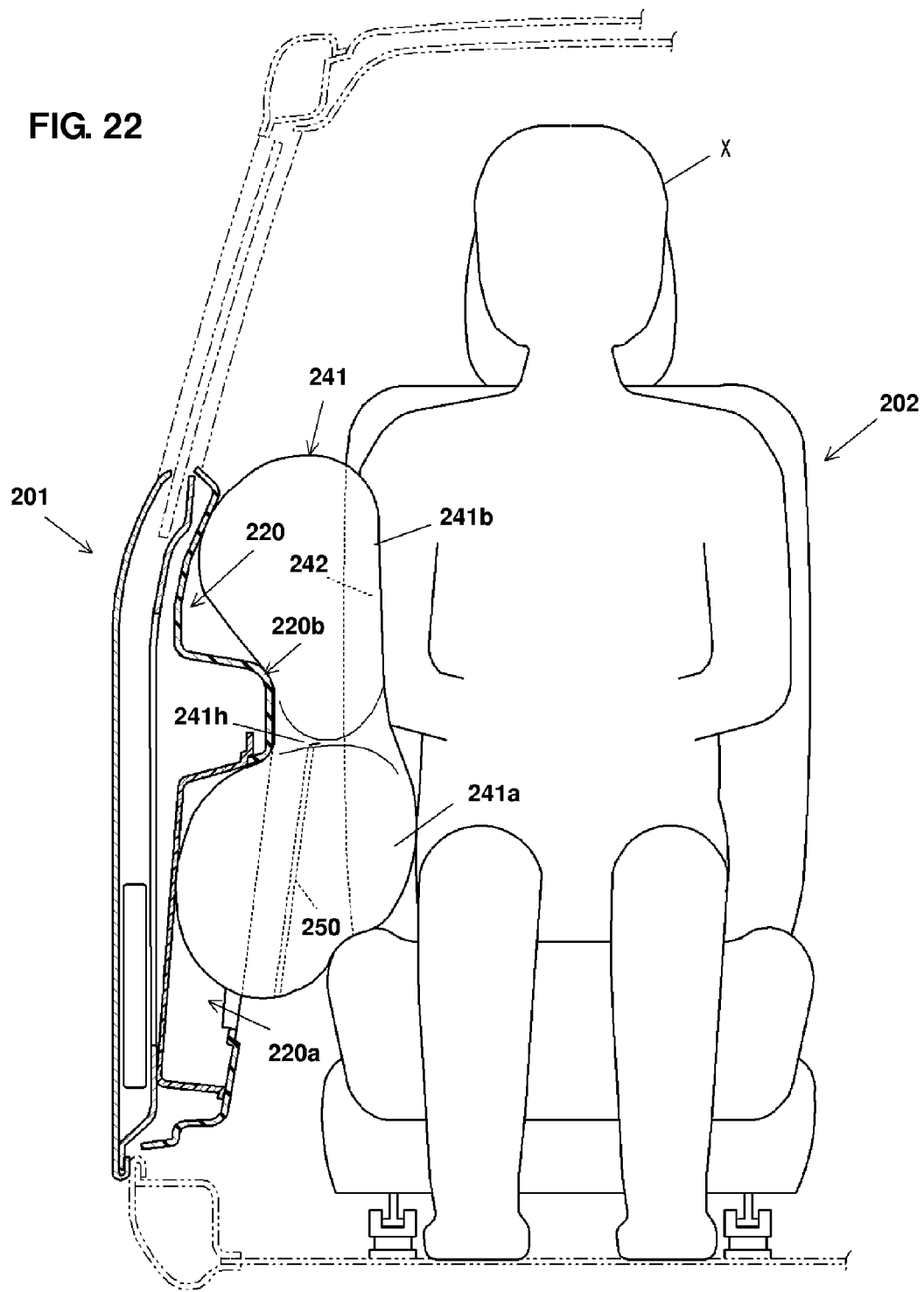
FIG. 22 is a sectional view of the interior structure with the airbag inflating, which corresponds to FIG. 20 (the vehicle body and others illustrated by two-dotted broken lines).

According to the present embodiment, a side airbag device 240 is stored in a right upper portion of the seatback 231 of the seat 202. This side airbag device 240 comprises an airbag 241 which is stored in its folded state, an inflator 242 which generates gas by receiving an inflation signal and supplies the gas to the airbag 241, a side-crash detecting sensor (not illustrated) which detects the side crash, and a controller (not illustrated) which outputs the inflation signal to the inflator 242 when receiving an detection signal from the side-crash detecting sensor. When the side crash of the vehicle happens, the gas from the inflator 242 is supplied to the airbag 241, and the airbag 241 is made inflate beside the seat 202 on the side of the side door 201 as shown in FIGS. 21 and 22. Herein, the airbag 241 is attached to a seatback frame 231F and gets out of the seatback 231, breaking a stitch portion 231X which is formed at a side portion of the seatback 231.

Figure 23:
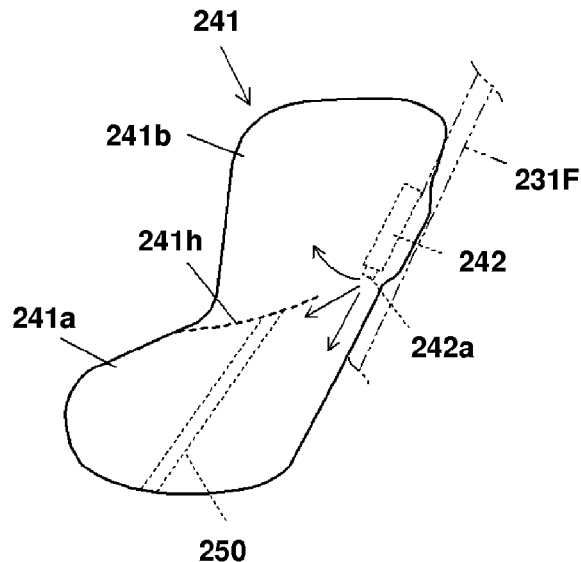
FIG. 23 is a side view of the airbag itself.
Figure 24:
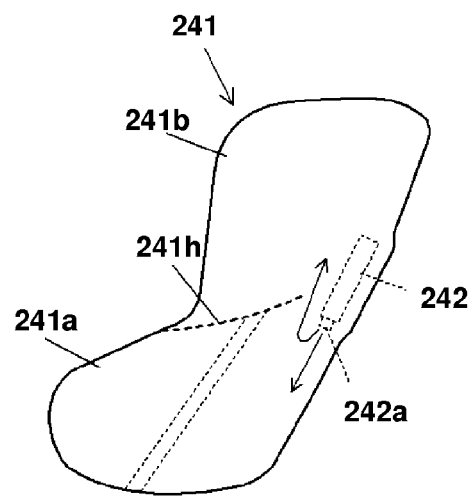
FIG. 24 is a side view of an airbag itself of an interior structure of a vehicle according to a twelfth embodiment.

As shown in FIG. 23, the airbag 241 has an original shape with a narrow waist portion at its middle portion in the vertical direction, and the airbag 241 is made of two sheets of cloth which are stitched together at their peripheries. Further, the airbag 241 has a stitch portion 241h at its middle portion which separates the airbag 241 into an upper portion and a lower portion. The lower portion below the stitch portion 241h constitutes a waist-protecting portion 241a which inflates beside the waist portion of the passenger X and protect that passenger's waist portion. The upper portion above the stitch portion 241h constitutes a chest-protecting portion 241b which inflates above the waist-protecting portion 241a and protect that passenger's chest portion. Herein, the separation position of the inflating airbag 241 is set at the level of the armrest 220b of the door trim 220 as apparent from FIGS. 23 and 24. Thereby, the waist-protecting portion 241a inflates beside the recess 220a and below the armrest 220b, and the chest-protecting portion 241b inflates above the armrest 220b.

As shown in FIG. 23, the inflator 242 is stored in a rear portion of the chest-protecting portion 241b of the airbag 241, which is common to the chest-protecting portion 241b and the waist-protecting portion 241a. Specifically, an outlet 242a of the gas is disposed almost behind the stitch portion 241h for separation and emits the gas downward. The inflator 242 is fixed to a portion of the frame 231F of the seatback 231 which is positioned above the recess 220a of the side door 201, along with a rear end portion of the chest-protecting portion 241b of the airbag 241 in the folded state.

Herein, while the recess 220a extends in the vehicle longitudinal direction as apparent from FIG. 19, its rear portion reaches a position which is located beside the waist portion of the passenger X. This is because the airbag 241 is provided. That is, the size of the impact absorbing member 214 beside the passenger's waist portion can be made small (the small thickness) by providing the airbag 241. Further, the recess can be formed at the portion of the door trim 220 which is positioned beside the waist-protecting portion of the passenger X. Accordingly, the storage space around the side door 201 can be enlarged. Herein, the seat 202 is configured to slide longitudinally as described above, and the recess 220a is provided so as to correspond to the longitudinal moving range of the waist portion of the seated passenger X when the driver's seat 202 slides longitudinally.

Moreover, according to the present embodiment, as shown in FIGS. 21 through 23, an inflation restraining member 250 which restrains the inflation of the airbag in the vertical direction so as to promote the inflation of the airbag located beside the recess 220a in the vehicle width direction. Specifically, the inflation restraining member 250 is constituted by a tape-shaped tether which expands substantially vertically inside the inflating airbag 241. Herein, a direction which is perpendicular to the tether face is substantially equal to the vehicle width direction. The tether is configured such that its upper end is fixed to the stitch portion 241h of the upper end of the waist-protecting portion 241a, and its lower end is fixed to a stitch portion (not illustrated) of the upper end of the waist-protecting portion 241a.

Hereinafter, the operations and advantages of the interior structure according to the present embodiment will be described.

When the another vehicle crashes against the side portion of the vehicle, for example, the side crash sensor detects this crash, the inflator 242 generates the gas, and the gas is supplied to the airbag 241, so that the airbag 241 inflates beside the side door 201 of the seat 202 as shown in FIGS. 21 and 22. Herein, according to the present embodiment, the inflation restraining member 250 restrains the inflation of the waist-protecting portion 241a in the vertical direction so that the inflation of the waist-protecting portion 241a beside the recess 220a in the vehicle width direction is promoted. Thereby, the thickness (the length in the vehicle width direction) of the inflating waist-protecting airbag 241a is made greater compared to a case the inflation restraining member 250 is not provided, and the inflating waist-protecting airbag 241a easily comes into the recess 220a before contacting the passenger seated. Consequently, the waist-protecting airbag 241a can be prevented from moving greatly toward the vehicle outside when the passenger X contacts the waist-protecting airbag 241a and thereby the passenger X can be held by the waist-protecting airbag 241a properly. That is, the passenger X can be protected properly. Further, since the vertical inflation of the waist-protecting airbag 241a is restrained by the inflation restraining member 250, the large-sized airbag 241, in particular, the waist-protecting airbag 241a can be avoided as well. Thus, according to the present embodiment, the seated passenger X can be properly protected, restraining the size of the airbag 241 from being large sized, even in case the recess 220a is formed at the inner face of the side door 201 beside the seated passenger X.

Further, according to the present embodiment, the armrest 220b is provided so as to extend in the vehicle longitudinal direction along the upper edge of the recess 220a, and the waist-protecting portion 241a of the airbag 241 inflates at the position which is located beside the recess 220a and below the armrest 220b. Thereby, any improper interference of the inflating waist-protecting airbag 241a of the airbag 241 with the armrest 220b can be avoided even in case the armrest 220b is provided.

Moreover, since the waist-protecting airbag 241a and the chest-protecting airbag 241b are formed by the separation of the single bag 241, there is no need of making these airbags 241a, 241b separately as a single airbag. Thereby, the reduction of manufacturing costs and improvement of disposition of the airbags can be achieved. Herein, since the position of the separation is located at the level of the armrest 220b when the airbag 241 inflates, the interference of the both airbags 241a, 241b with the armrest 220b can be avoided, thereby ensuring the proper inflation of the both airbags 241a, 241b. The inflator 242 which supplies the gas to the waist-protecting airbag 241a and the chest-protecting airbag 241b of the airbag 241 is common to the two bags 241a, 241b. Accordingly, the reduction of manufacturing costs and improvement of disposition of the airbags can be further promoted.

Embodiment 12

A twelfth embodiment will be described. Herein, the same structure elements as or similar structure elements to those of the above-described eleventh embodiment are denoted by the same reference characters. This is applied to the following embodiments as well.

The inflator 242 of the twelfth embodiment is stored substantially vertically at a rear portion in the airbag 241 such that the gas outlet 242a is positioned below the stitch portion 241h inside the waist-protecting portion 241a. The other structures are the same as those of the above-described eleventh embodiment. According to the twelfth embodiment, as apparent from FIG. 24, the gas is emitted into the waist-protecting portion 241a, and the gas to the chest-protecting portion 241b by way of the waist-protecting portion 241a. That is, the gas is supplied to the waist-protecting airbag 241a mainly, giving priority to the inflation of the waist-protecting portion 241a. Accordingly, in addition to the advantages of the eleventh embodiment, the protection of the waist portion which may be the most important can be effectively protected.

Embodiment 13

A thirteenth embodiment will be described.

Figure 25:
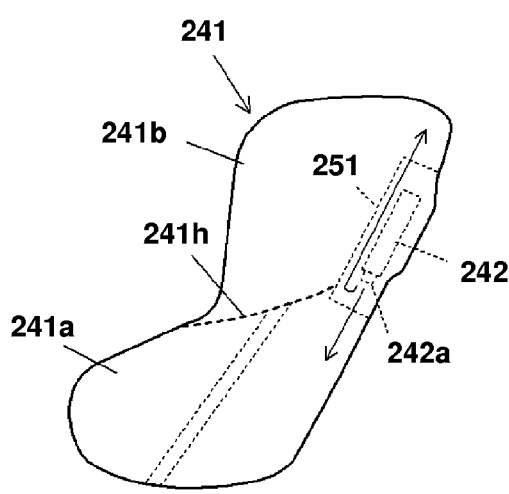
FIG. 25 is a side view of an airbag itself of an interior structure of a vehicle according to a thirteenth embodiment.

According to the thirteenth embodiment, as shown in FIG. 25, a cylindrical diffuser 251 is attached to a rear portion inside the airbag 241 so as to extend in substantially vertically such that its upper end opens inside the chest-protecting portion 241b and its lower end opens inside the waist-protecting portion 241a. The diffuser 251 constitutes a gas supply passage which reaches the chest-protecting portion 241b and the waist-protecting portion 241a. In this case, the inflator 242 is disposed downward such that the gas outlet 242a is located near the lower end of the diffuser 251. Thereby, as apparent from FIG. 25, the length of the gas supply passage for the waist-protecting airbag 241a is shorter than that of the gas supply passage for the chest-protecting airbag 241b. A rear end of the stitch portion 241h for separation connects to a front end of the diffuser 251. The other structures are the same as those of the above-described eleventh embodiment.

According to the thirteenth embodiment, since the length of the gas supply passage for the waist-protecting airbag 241a to protect the waist portion of the passenger X is shorter than that of the gas supply passage for the chest-protecting airbag 241b, the gas can be supplied to the waist-protecting airbag 241a mainly, giving priority to the protection of the passenger's waist portion in addition to the advantages of the above-described eleventh embodiment. Further, since the diffuser 251 is provided and the rear end of the stitch 241h for separation connects to the front end of the diffuser 251, the independency of the waist-protecting portion 241a and the chest-protecting portion 241b can be improved and the gas pressure can be controlled to a specified pressure easily.

Herein, a check valve which allows the gas to flow toward the chest-protecting portion 241b when the gas pressure of the waist-protecting portion 241a exceeds a specified pressure (a pressure enough to protect the passenger) may be provided between the waist-protecting portion 241a and the chest-protecting portion 241b. Thereby, the gas pressure of the waist-protecting portion 241a can be prevented from becoming too high, and the chest-protecting portion 241b can be made inflate promptly after the inflation of the waist-protecting portion 241a (reaching the specified pressure).

Embodiment 14

A fourteenth embodiment will be described.

Figure 26:
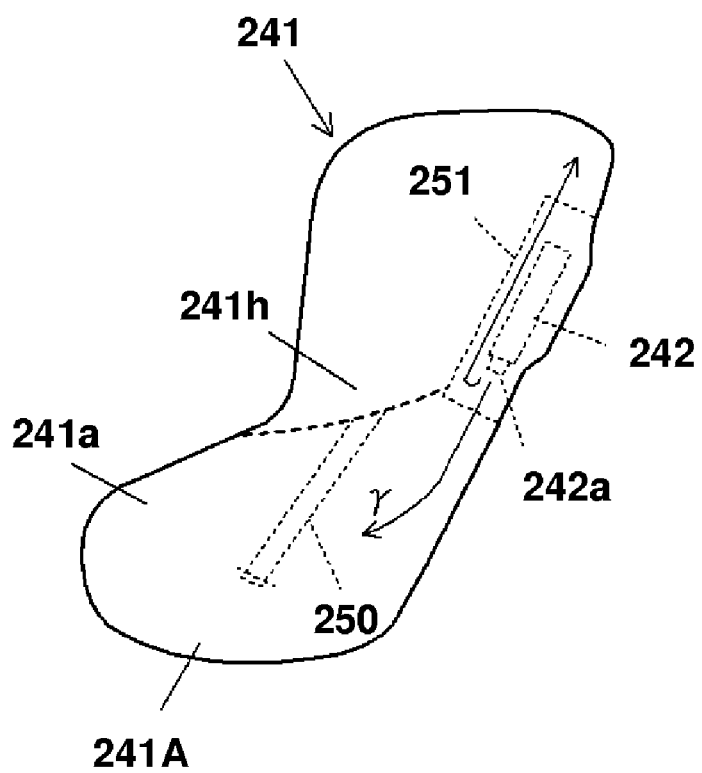
FIG. 26 is a side view of an airbag itself of an interior structure of a vehicle according to a fourteenth embodiment.

According to the fourteenth embodiment, as shown in FIG. 26, the lower end of the inflation restraining member 250 in the above-described eleventh embodiment is sewed to a specified position of an inside cloth 241A which is located above its lower end. In other words, the lower end of the inflation restraining member 250 is joined to a specified portion which is located toward the vehicle inside from a lower end of the waist-protecting airbag 241a. The other structures are the same as those of the above-described thirteenth embodiment.

Figure 27:
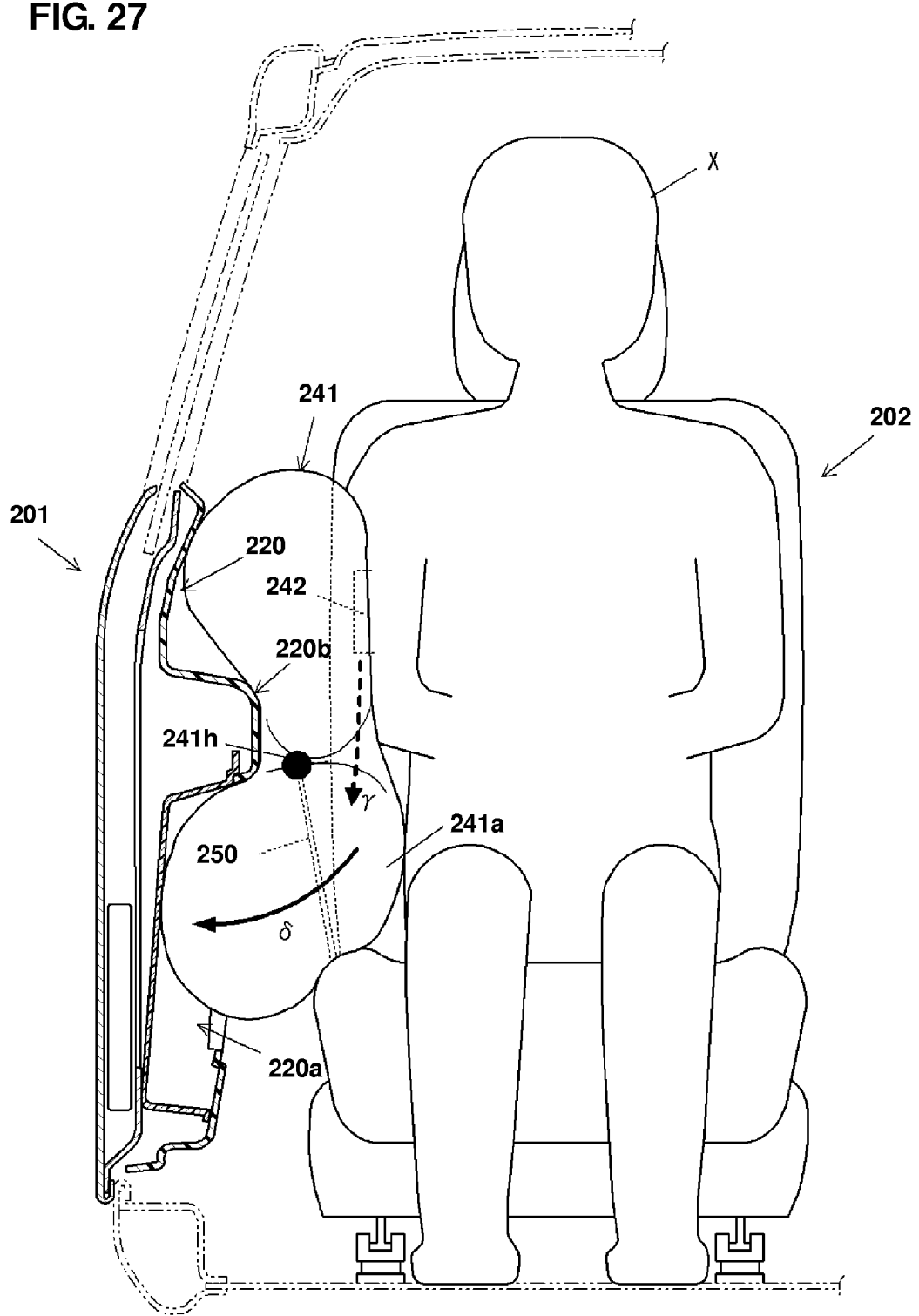
FIG. 27 is a sectional view of an interior structure of a vehicle according to the fourteenth embodiment, which corresponds to FIG. 20.

According to the fourteenth embodiment, the gas is emitted downward as shown by an arrow γ from the inflator 242 into the airbag 241, and the inflation restraining member 250 (tether) extends substantially vertically with tension when the waist-protecting portion 241a of the airbag 241 inflates. Thereby, a force acts on the waist-protecting airbag 241a of the airbag 241 so as to make the waist-protecting airbag 241a rotate in such a manner that its lower portion rotates toward the side door 201 around the upper portion of the waist-protecting airbag 241a as shown by an arrow δ in FIG. 27. As a result, the waist-protecting airbag 241a rotates toward the recess 220a. Accordingly, a situation in which the waist-protecting airbag 241a moves toward the side door 201 after the seated passenger X contacts the waist-protecting airbag 241a can be retrained more properly.

Embodiment 15

A fifteenth embodiment will be described.

Figure 28A:
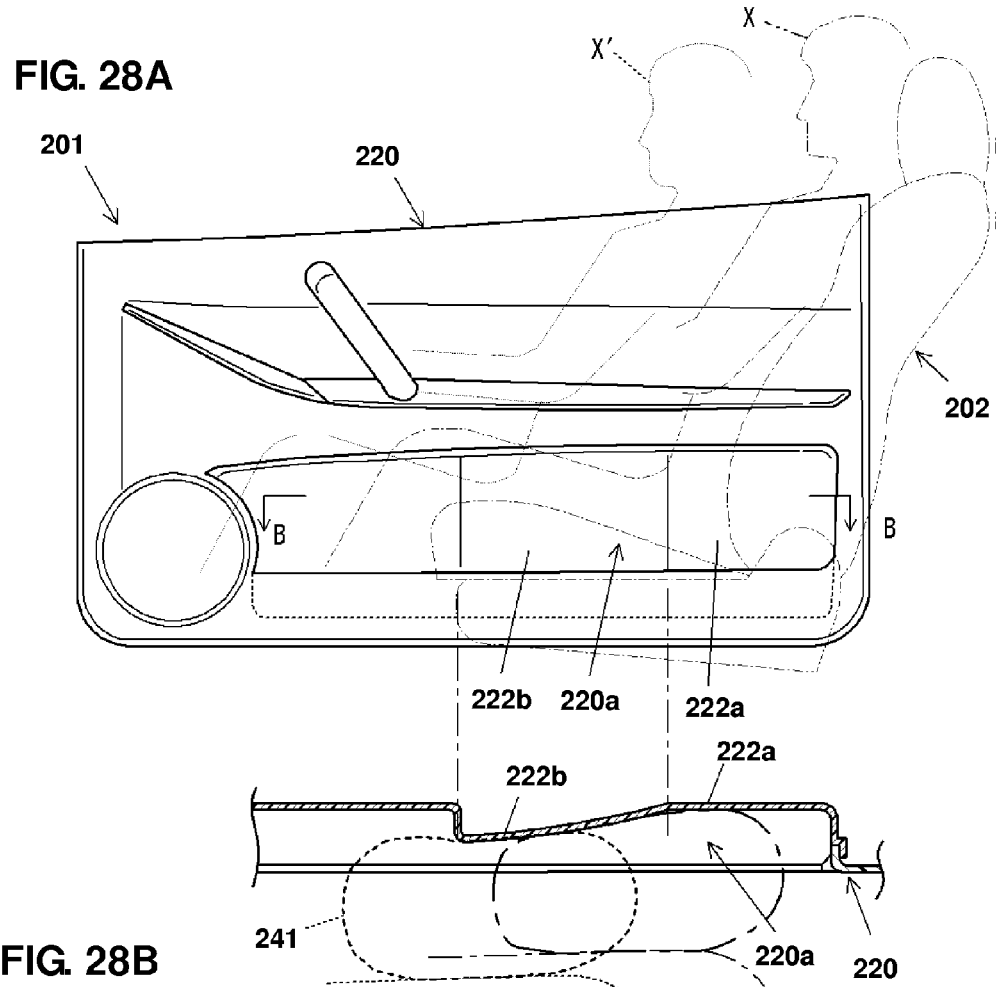
FIG. 28A is a side view of an interior structure of a vehicle according to a fifteenth embodiment, which corresponds to FIG. 19.
Figure 28B:
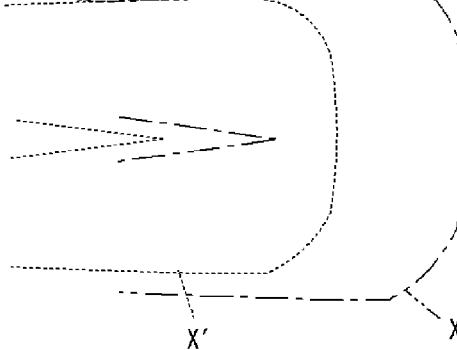
FIG. 28B is sectional view taken along line B-B of FIG. 28A.

According to the fifteenth embodiment, as shown in FIGS. 28A, B, the recess 220a of the door trim 220 of the side door 201 in the above-described eleventh embodiment is located at a position which corresponds to the moving range of the waist portion of the seated passenger X when the driver's seat 202 slides longitudinally (the same manner as the eleventh through fourteenth embodiments). This is to make the seated passenger X easily put in or out articles for the recess 220a for storage or the like.

Herein, a relatively-small sized passenger X' has a smaller width of the waist portion (in the vehicle width direction) compared to the normal sized passenger X, so that the distance between the waist portion and a side wall 222a of the recess 220a becomes greater. Meanwhile, the width of the airbag 241 (in the vehicle width direction) is constant. Therefore, in case the small-sized passenger X' is seated, the moving distance of the small-sized passenger X' till the passenger's contact with the airbag in the vehicle width direction may become greater, so that there is a concern that the small-sized passenger X' would receive a larger impact. Herein, in case the relatively-small sized passenger X' is seated in the driver' seat, this passenger x' tends to slide the seat forward to hold a steering wheel appropriately.

According to the present embodiment, the width of the recess 220a of the door trim 220 in the vehicle width direction is configured such that the width of its front portion which is located at a position which corresponds to the waist portion of the passenger X seated in the driver's seat 202 which has slid forward is smaller than that the width of its rear portion which is located at a position which corresponds to the waist portion of the passenger X seated in the driver's seat 202 which slid rearward. That is, a projecting portion 222b which projects toward the vehicle inside is formed at a front portion of the side wall 222a which is located at the position which corresponds to the waist portion of the passenger X seated in the driver's seat 202 which has slid forward. This projecting portion 222b is slant in such a manner that its rear portion is located on the side of the vehicle outside. This is because it is considered that the body size of the passenger is relatively large when the seat 202 has slid rearward and in this case the distance between the passenger and the side wall 222a is narrow. The other structures are the same as those of the above-described thirteenth embodiment.

According to the fifteenth embodiment, the distance between the relatively-small sized passenger X' and the side wall of the recess 220a can be properly restrained, so that the impact absorption can be achieved properly even in case of the relatively-small sized passenger X'. Herein, while the fifteenth embodiment explains about the driver's seat, the present invention can be applied to the passenger seat (assistant seat). In case the relatively-small sized passenger X' is seated in the passenger's seat (assistant's seat), this passenger tends to slide the seat forward to operate equipments provided at the instrument panel or the like appropriately.

The present invention should not be limited to the above-descried embodiments, and any other modifications and improvements may be applied within the scope of a sprit of the present invention.

What is claimed is:

1. An interior structure of a vehicle, comprising:
   a door trim covering a door body of a side door of the vehicle from a vehicle inside;
   a vehicle-equipment portion provided at a lower portion of said door trim;
   a recess provided at said door trim, the recess being concaved toward a vehicle outside at an upper portion of the door trim which is located above said vehicle-equipment portion of the door trim;
   a seat provided beside the side door, the seat and the side door being overlapped when viewed from a vehicle side; and
   a side airbag device equipped with an airbag and stored in said seat, the airbag inflates with gas supplied from an inflator at a vehicle side crash so as to protect at least a waist portion of a passenger seated in said seat,
   wherein said recess is position beside the passenger seated in the seat, and a cover member is provided at said door trim to cover over at least part of said recess, said cover member is located at a specified position in a vehicle width direction and is to contact the inflating airbag during a vehicle side crash and to hold the inflating airbag inside the vehicle and restrain the inflating airbag from protruding into the recess.

2. The interior structure of a vehicle of claim 1, wherein an armrest which extends in a vehicle longitudinal direction along an upper edge of said recess and projects toward the vehicle inside is provided at a portion of said door trim located above said vehicle-equipment portion, the vehicle-equipment portion comprising an article storage portion formed by an inside wall and an outside wall, which are disposed facing to each other, and a bottom wall which interconnects the inside and outside walls, and said covering member extends from an upper edge of said inside wall to a position near a lower portion of the armrest.

3. The interior structure of a vehicle of claim 2, wherein said covering member comprises an upper portion which takes a closed position in which said recess is covered with the covering member and an open position in which the covering member opens toward the vehicle inside.

4. The interior structure of a vehicle of claim 2, wherein an upper end of said covering member extends rearward so as to slant upward.

5. The interior structure of a vehicle of claim 1, wherein said seat is to slide in a vehicle longitudinal direction by means of a slide mechanism with a slide rail, and said covering member is positioned so as to overlap with a moving range of a hip point of the passenger seated in the seat which is formed according to a slide of the seat when viewed from the vehicle side.

6. The interior structure of a vehicle of claim 1, wherein said covering member is movable in a vehicle longitudinal direction or the width of the covering member in the vehicle longitudinal direction is adjustable.

7. The interior structure of a vehicle of claim 1, wherein said covering member is made of a net.

8. An interior structure of a vehicle, comprising:
a door trim covering a door body of a side door of the vehicle from a vehicle inside;
a vehicle-equipment portion provided at a lower portion of said door trim;
a recess provided at said door trim, the recess being concaved toward a vehicle outside at an upper portion of the door trim which is located above said vehicle-equipment portion of the door trim;
a seat provided beside the side door, the seat and the side door being overlapped when viewed from a vehicle side; and
a side airbag device equipped with an airbag and stored in said seat, the airbag inflates with gas supplied from an inflator at a vehicle side crash to protect at least a waist portion of a passenger seated in said seat,
wherein said recess is position beside the passenger seated in the seat, and a controlling means for controlling a vehicle-width position of said airbag by inflating around the recess is provided,
the interior structure further comprises a seatbelt to restrain a move of the passenger seated at the vehicle side crash, wherein said seatbelt comprises a lap-belt portion to hold the waist portion of the passenger, said lap-belt portion includes an air belt at a vehicle-outside portion thereof which inflates with gas supplied from another inflator for air belt at the vehicle side crash at a position which is located on the side of the passenger relative to said airbag of the side airbag device, said air belt constitutes said controlling means, and said air belt and said airbag of the side airbag device inflate between said door trim and the passenger seated so as to be overlapped when viewed from the vehicle side, and
said airbag of the side airbag device comprises a waist-protecting airbag to protect the waist portion of the passenger seated and a chest-protecting airbag to protect a chest portion of the passenger seated, the waist-protecting airbag and the chest-protecting airbag are connected via a connecting portion, and the inflator of the side airbag device is arranged such that the waist-protecting airbag inflates before the chest-protecting airbag does at the vehicle side crash.

9. An interior structure of a vehicle, comprising:
a door trim covering a door body of a side door of the vehicle from a vehicle inside;
a vehicle-equipment portion provided at a lower portion of said door trim;
a recess provided at said door trim, the recess being concaved toward a vehicle outside at an upper portion of the door trim which is located above said vehicle-equipment portion of the door trim;
a seat provided beside the side door, the seat and the side door being overlapped when viewed from a vehicle side; and
a side airbag device equipped with an airbag and stored in said seat, the airbag inflates with gas supplied from an inflator at a vehicle side crash so as to protect at least a waist portion of a passenger seated in said seat,
wherein said recess is position beside the passenger seated in the seat, and a controlling means for controlling a vehicle-width position of said airbag by inflating around the recess is provided,
the interior structure further comprises a seatbelt to restrain a move of the passenger seated at the vehicle side crash, wherein said seatbelt comprises a lap-belt portion to hold the waist portion of the passenger, said lap-belt portion includes an air belt at a vehicle-outside portion thereof which inflates with gas supplied from another inflator for air belt at the vehicle side crash at a position which is located on the side of the passenger relative to said airbag of the side airbag device, said air belt constitutes said controlling means, and said air belt and said airbag of the side airbag device inflate between said door trim and the passenger seated so as to be overlapped when viewed from the vehicle side, and
said air belt of the seatbelt inflates up to a maximum inflation state thereof after said waist-protecting airbag of the side airbag device does.

10. An interior structure of a vehicle, comprising:
a door trim covering a door body of a side door of the vehicle from a vehicle inside;
a vehicle-equipment portion provided at a lower portion of said door trim;
a recess provided at said door trim, the recess being concaved toward a vehicle outside at an upper portion of the door trim which is located above said vehicle-equipment portion of the door trim;
a seat provided beside the side door, the seat and the side door being overlapped when viewed from a vehicle side; and
a side airbag device equipped with an airbag and stored in said seat, the airbag inflates with gas supplied from an inflator at a vehicle side crash so as to protect at least a waist portion of a passenger seated in said seat, wherein said recess is position beside the passenger seated in the seat, and a controlling means for controlling a vehicle-width position of said airbag by inflating around the recess is provided, and said controlling means is constituted by an inflation restraining member provided at a portion of said airbag which protects the waist portion of the passenger seated in the seat and restrains an inflation of said portion of the airbag in a vertical direction so as to promote the inflation of said portion of the airbag located beside said recess in a vehicle width direction.

11. The interior structure of a vehicle of claim 10, wherein an armrest which extends in a vehicle longitudinal direction along an upper edge of said recess and projects toward a vehicle inside is provided on an inside face of the side door, and said portion of the airbag which protects the waist portion of the passenger seated in the seat inflates at a position which is located beside the recess and below the armrest.

12. The interior structure of a vehicle of claim 11, wherein said airbag of the side airbag device comprises a waist-protecting airbag to protect the waist portion of the passenger seated and a chest-protecting airbag to protect a chest portion of the passenger seated, the waist-protecting airbag and the chest-protecting airbag are formed by a separation of a single bag, and a position of the separation is located at a level of said armrest when the airbag inflates.

13. The interior structure of a vehicle of claim 12, wherein the inflator which supplies the gas to said waist-protecting airbag and chest-protecting airbag is common to the two bags, and the length of a gas supply passage for the waist-protecting airbag is shorter than that of a gas supply passage for the chest-protecting airbag.

14. The interior structure of a vehicle of claim 10, wherein said airbag is attached to an attaching position of the seat which is located above said recess of the side door and inflates downward from said attaching position according to the gas supply which is directed downward, said inflation restraining member is constituted by a tether which expands substantially vertically inside said portion of the inflating airbag which protects the waist portion of the passenger seated in the seat, an upper end of which is joined to an upper end of said portion of the inflating airbag which protects the waist portion of the passenger seated and a lower end of which is joined to a specified portion which is located toward the vehicle inside from a lower end of said portion of the inflating airbag which protects the waist portion of the passenger seated.

15. The interior structure of a vehicle of claim 10, wherein said seat is a driver's seat or a passenger's seat, which are movable with a longitudinal slide, said recess is located at a position which corresponds to a moving range of the waist portion of the passenger seated, and a width of said recess in the vehicle width direction is configured such that the width of a front portion of the recess which is located at a position which corresponds to the waist portion of the passenger seated in the seat which has slid forward is smaller than that the width of a rear portion of the recess which is located at a position which corresponds to the waist portion of the passenger seated in the seat which slid rearward.

* * * * *